US010025952B1

(12) United States Patent
Wang et al.

(10) Patent No.: US 10,025,952 B1
(45) Date of Patent: Jul. 17, 2018

(54) OBFUSCATION OF SENSITIVE HUMAN-PERCEPTUAL OUTPUT

(71) Applicants: The Florida State University Research Foundation, Inc., Tallahassee, FL (US); The Regents of the University of California, Oakland, CA (US)

(72) Inventors: An-I Andy Wang, Tallahassee, FL (US); Michael Mitchell, North Bend, WA (US); Peter Reiher, Los Angeles, CA (US)

(73) Assignees: THE FLORIDA STATE UNIVERSITY RESEARCH FOUNDATION, INC., Tallahassee, FL (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 129 days.

(21) Appl. No.: 14/949,449

(22) Filed: Nov. 23, 2015

Related U.S. Application Data

(60) Provisional application No. 62/082,982, filed on Nov. 21, 2014.

(51) Int. Cl.
*G06F 7/04* (2006.01)
*G06F 12/14* (2006.01)
*G06F 21/62* (2013.01)
*G06F 21/31* (2013.01)

(52) U.S. Cl.
CPC ......... *G06F 21/6245* (2013.01); *G06F 21/31* (2013.01)

(58) Field of Classification Search
CPC .............................. G06F 21/6245; G06F 21/31
USPC ........................................ 726/19, 26; 713/189
See application file for complete search history.

(56) References Cited

U.S. PATENT DOCUMENTS

| | | | | |
|---|---|---|---|---|
| 6,075,843 A * | 6/2000 | Cave | ...................... | H04M 1/247 379/88.13 |
| 8,726,398 B1 * | 5/2014 | Tock | ................... | H04L 63/0421 713/161 |
| 2007/0168379 A1 * | 7/2007 | Patel | ................... | G06F 17/3061 |
| 2008/0301805 A1 * | 12/2008 | Bharara | ................ | G06F 19/321 726/21 |

(Continued)

OTHER PUBLICATIONS

About Adblock Plus at https://adblockplus.org/en/about, accessed on Feb. 10, 2016, pp. 1-4.

(Continued)

*Primary Examiner* — Aravind K Moorthy
(74) *Attorney, Agent, or Firm* — Nicholas Pfeifer; Smith & Hopen, P.A.

(57) ABSTRACT

The present invention includes a system and method for defending against unwanted observations of the information conveyed by electronic devices. The system allows users to access sensitive information in public without the fear of visual or other observational leaks. The present invention intercepts sensitive data elements before they are conveyed to a user and replaces the sensitive data with non-sensitive information referred to as aliases. In addition, the system provides a means of computing with sensitive data in a non-observable way. All of this is accomplished while maintaining full functionality and legacy compatibility across applications.

20 Claims, 11 Drawing Sheets

(56) References Cited

U.S. PATENT DOCUMENTS

| | | | | |
|---|---|---|---|---|
| 2010/0306651 | A1* | 12/2010 | Quennesson | G06F 8/71 715/704 |
| 2010/0332998 | A1* | 12/2010 | Sun | G06F 3/04815 715/757 |
| 2012/0079267 | A1* | 3/2012 | Lee | G06F 21/6218 713/156 |
| 2014/0123045 | A1* | 5/2014 | Wilhelm Martens | G06F 3/0484 715/770 |
| 2014/0337301 | A1* | 11/2014 | Jang | G06F 17/30563 707/698 |
| 2015/0040246 | A1* | 2/2015 | Yuen | H04L 63/168 726/30 |
| 2015/0055155 | A1* | 2/2015 | Amano | G06F 3/1222 358/1.11 |
| 2016/0314720 | A1* | 10/2016 | Kim | G06F 21/36 |

OTHER PUBLICATIONS

Brunelli et al., "Person Identification Using Multiple Cues", IEEE Transactions on Pattern Analysis and Machine Intelligence. vol. 17, No. 10 (Oct. 1995), pp. 955-966.

Daugman. "How iris recognition works", IEEE Transactions on Circuits and Systems for Video Technology. vol. 14, No. 1 (Jan. 2004), pp. 21-30.

Davis et al., "On user choice in graphical password schemes", In Proceedings of the 13th conference on USENIX Security Symposium—vol. 13 (SSYM'04) USENIX Association, Berkeley, CA, USA, pp. 1-14.

Dhamija aet al., "Deja; Vu: a user study using images for authentication", In Proceedings of the 9th conference on USENIX Security Symposium—vol. 9 (SSYM'00) USENIX Association, Berkeley, CA, USA, pp. 1-14.

Do Not Track. "Do Not Track—Universal Web Tracking Opt Out", at http://donottrack.us., accessed on Feb. 10, 2016.

Gafurov et al., "Biometric Gait Authentication Using Accelerometer Sensor", Journal of Computers, vol. 1, No. 7, Oct. 2006, pp. 51-59.

Jain et al., "An identity-authentication system using fingerprints," Proceedings of the IEEE, vol. 85, No. 9, pp. 1365, 1388, Sep. 1997.

Jain et al., "A Prototype Hand Geometry-based Verifcation System", In Proceedings of 2nd International Conference an Audio- and Video-based Biometric Person Authentication (AVBPA), Washington D.C., pp. 166-171, Mar. 22-24, 1999.

Joyce et al., "Identity authentication based on keystroke latencies", Communications of the ACM ,vol. 33, No. 2 (Feb. 1990), pp. 168-176.

Khalaf, "Apps Solidify Leadership Six Years into Mobile Revolution," Flurry, http://www.flurry.com, 2014, accessed Feb. 3, 2016, pp. 1-6.

McCallister et al., Guide to Protecting the Confidentiality of Personally Identifiable Information (SP 800-122). National Institute of Standards and Technology, http://csrc.nist.gov/publications/nistpubs/800-122/sp800-122.pdf, pp. 1-59.

Geetha Pillai, "Caught on Camera: You are Filmed on CCTV 300 Times a Day in London", International Business Times, Mar. 2012. http://www.ibtimes.co.uk/britaincctv-camera-surveillance-watch-london-big-312382, pp. 1-3, accessed Feb. 10, 2016.

Roth et al., "A PIN-entry method resilient against shoulder surfing", In Proceedings of the 11th ACM conference on Computer and communications security (CCS '04). ACM, New York, NY, USA, pp. 236-245.

Real User Corporation. "The Science Behind Passfaces", Jun. 2004. http://www.realuser.com/published/ScienceBehindPassfaces.pdf, pp. 1-9.

Wiedenbeck et al., "PassPoints: design and longitudinal evaluation of a graphical password system" International Journal of Human-Computer Studies. 63, (Jul. 2005), pp. 102-127.

Zhao et al., "Face recognition: A literature survey". ACM Computing Surveys, vol. 35, No. 4 (Dec. 2003), pp. 399-458.

Chu et al., Mobile Apps: It's Time to Move Up to CondOS, Microsoft Research Redmond, Microsoft Research Asia, pp. 1-5.

Consolvo et al., The Wi-Fi Privacy Ticker: Improving Awareness & Control of Personal Information Exposure on Wi-Fi, UbiComp '10, Sep. 26-Sep. 29, 2010, Copenhagen, Denmark, pp. 321-330.

Falaki et al., Diversity in Smartphone Usage, MobiSys'10, Jun. 15-18, 2010, San Francisco, California, USA, pp. 179-194.

Felt et al., I've Got 99 Problems, But Vibration Ain't One: A Survey of Smartphone Users' Concerns, UC Berkeley technical report, from May 2012, pp. 1-9.

Foster et al., Chimera: AVirtual Data System for Representing, Querying, and Automating Data Derivation, Mathematics and Computer Science Division, Argonne National Laboratory, Argonne, IL 60439, USA, Department of Computer Science, University of Chicago, Chicago, IL 60637, USA, pp. 1-10.

Goucher, Look behind you: the dangers of shoulder surfing, Computer Fraud & Security, Nov. 2011, pp. 17-20.

Guo, CDE: Run Any Linux Application On-Demand Without Installation, Stanford University, pp. 1-16.

Kalam et al., Organization based access control, Proceedings of the 4th International Workshop on Policies for Distributed Systems and Networks, 2003, pp. 1-12.

Kientz et al., Texting from the Toilet: Mobile Computing Use and Acceptance in Public and Private Restrooms, CHI'13, Apr. 27-May 2, 2013, Paris, France, pp. 1-9.

Klasnja et al., "When I am on Wi-Fi, I am Fearless:" Privacy Concerns & Practices in Everyday Wi-Fi Use, CHI 2009 Security and Privacy Apr. 9, 2009 Boston, MA, USA, pp. 1-10.

Kowitz et al., Peripheral Privacy Notifications for Wireless Networks, WPES'05, Nov. 7, 2005, Alexandria, Virginia, USA, pp. 90-96.

Kulkarni et al., Context-Aware Role-based Access Control in Pervasive Computing Systems, SACMAT'08, Jun. 11-13, 2008, Estes Park, Colorado, USA, pp. 113-122.

Moyer et al., Generalized Role-Based Access Control, 2001 IEEE, pp. 391-398.

Peek et al., TrapperKeeper: Using Virtualization to Add Type-Awareness to File Systems, Computer Science and Engineering, University of Michigan, pp. 1-14.

Raguram et al., iSpy: Automatic Reconstruction of Typed Input from Compromising Reflections, CCS'11, Oct. 17-21, 2011, Chicago, Illinois, USA, pp. 1-10.

Sandhu et al., Role-Based Access Control: A Multi-Dimensional View, SETA Corporation, 1994 IEEE, pp. 54-62.

Tahir, C-RBAC:Contextual Role-Based Access Control Model, Ubiquitous Computing and Communication Journal, vol. 2, No. 3, pp. 67-74.

Tzelepi et al., A flexible Content and Context-based Access Control Model for Multimedia Medical Image Database Systems, Multimedia and Security Ottawa Canada 2001, pp. 52-55.

Walton et al., Public access, private mobile, The interplay of shared access and the mobile Internet for teenagers in Cape Town, Global Impact Study Research Report Series, Oct. 2012, pp. 1-69.

Bianchi et al., The Secure Haptic Keypad: A Tactile Password System, In Proceedings of the SIGCHI Conference on Human Factors in Computing Systems (CHI '10). ACM, New York, NY, USA, pp. 1089-1092.

De Luca et al., "Touch me once and I know it's you!: implicit authentication based on touch screen patterns", In Proceedings of the SIGCHI Conference on Human Factors in Computing Systems (CHI '12). Austin, Texas, USA, pp. 387-996.

Halderman et al. . "A convenient method for securely managing passwords", In Proceedings of the 14th international conference on World Wide Web (WWW '05). ACM, New York, NY, USA, pp. 471-479.

Jansen et al., "A Location-Based Mechanism for Mobile Device Security", In Proceedings of the 2009 WRI World Congress on Computer Science and Information Engineering (CSIE '09), vol. 1. IEEE Computer Society, Washington, DC, USA, pp. 99-104.

Shapiro, "Structure and Encapsulation in Distributed Systems: the Proxy Principle", In Proceedings of the 6th IEEE International Conference on Distributed Computing Systems (ICDCS), Cambridge MA (USA), May 1986, pp. 198-204.

(56) References Cited

OTHER PUBLICATIONS

Thorpe et al., "Pass-thoughts: authenticating with our minds", In Proceedings of the 2005 workshop on New security paradigms (NSPW '05). ACM, New York, NY, USA, pp. 45-56.

Forget et al., "Shoulder-surfing resistance with eye-gaze entry in cued-recall graphical passwords", In Proceedings of the SIGCHI Conference on Human Factors in Computing Systems (CHI '10). ACM, Atlanta, Georgia, USA, pp. 1107-1110.

* cited by examiner

OBFUSCATION OF SENSITIVE HUMAN-PERCEPTUAL OUTPUT

CROSS-REFERENCE TO RELATED APPLICATIONS

This nonprovisional application is a continuation of and claims priority to provisional application No. 62/082,982, entitled "OBFUSCATION OF SENSITIVE MOBILE DISPLAY DATA," filed Nov. 21, 2014 by the same inventor.

FEDERALLY SPONSORED RESEARCH OR DEVELOPMENT

This invention was made with Government support under Grant No. CSR 1065373 awarded by the National Science Foundation. The government has certain rights in the invention.

BACKGROUND OF THE INVENTION

1. Field of the Invention

This invention relates, generally, to cyber security. More specifically, it relates to a system to defend against attacks on mobile devices based on visual observations.

2. Brief Description of the Prior Art

Shoulder surfing has become a security concern in mobile computing. As mobile devices become increasingly capable, people are able to access a much richer set of applications in public places such as coffee shops and public transportation hubs. Inadvertently, users risk exposing sensitive information to bystanders via the screen display. Personal information exposure increases the risk of personal, fiscal, and criminal identity theft, while exposure of trade or governmental secrets increases the risk of business losses, government espionage, and other forms of cyber terrorism [12, 13, and 14]. This problem is exacerbated by the ubiquity of surveillance and high-power cameras on mobile devices such as smartphones and emerging wearable computing devices such as Google Glass [57]. Additionally, the trend towards multicore machines, GPUs, and cloud computing makes computing cycles much more accessible and affordable for criminals or even seasoned hobbyists, seeking to extract sensitive information via off-the-shelf visual analysis tools [58].

In a recent visual data survey of IT professionals, 85% of those surveyed admitted there have been cases when they were able to see unauthorized sensitive on-screen data, 82% admitted that there have been cases where their own sensitive on-screen data could be viewed by unauthorized personnel, and 82% had little or no confidence that users in their organization would protect their screen from sensitive data exposure to unauthorized personnel [1]. These results are consistent with other surveys indicating that 76% of respondents were concerned about people observing their screens in public [2], while 80% admitted that they have attempted to shoulder surf the screen of a stranger in a public location [3].

Moreover, the threat of shoulder-surfing will likely increase as mobile devices replace desktop computers. Mobile device sales now account for over 73% of annual technical device purchases [4]. Employees more frequently take their work with them on the go and it is estimated that by 2015, the world's mobile worker population will reach 1.3 billion [5]. This is highest in the US, where more than 80% of the workforce continues work after leaving the office [6], and figures suggest that 67% of employees regularly access sensitive data outside at places where they cannot do so safely [2]. While some organizations have implemented specific guidelines and practices to reduce this risk, 44% do not have any defined policy addressing these threats [1]. Advances in screen technology further increase the risk of exposure, with many new tablets claiming near 180-degree screen viewing angles [8].

Visual exposure of sensitive information in the form of observation-based attacks can come in many forms. Mobile devices with cameras are nearly ubiquitous. Currently, there are more than 3 billion digital camera phones in circulation [4]. These devices are evolving rapidly with newer models capable of capturing images at over 40 megapixels of resolution and over 10 times optical zoom for under $100 [7]. In addition, visual exposure can be captured by one of the billions of security devices in existence. These high-resolution and often insecure cameras are everywhere, especially in major metropolitan areas. For example, figures suggest the average resident of London is captured on CCTV over 300 times every day [9]. Finally, but no less threateningly, sensitive data can be exposed by simple human sight.

Observation-based attacks can also be much more complex. Increasingly sophisticated tools and systems have been developed to capture and exploit sensitive user data. Partial images can be merged, sharpened, and reconstructed, even from reflections. Optical Character Recognition (OCR) is becoming much more capable, with over 40 years of innovation. Offline and cloud-based OCR solutions are highly accurate with only a small percentage of error in recognition. Embedded OCR solutions are inexpensive and capable even on low-end hardware devices [10].

Personal information exposure also enables make other attacks possible. The capture of just a small number of personal information elements can greatly increase the risk of other threats including social engineering attacks, phishing, and other personal identity theft threats.

Observation-based information leaks can lead to significant personal and business losses. Recently, an S&P 500 company's profit forecasts were leaked because of visual data exposure. The vice president was working on the figures on a flight while sitting next to a journalist [4]. In a different case, British government documents were leaked when a senior officer fell asleep on a train, thereby permitting another passenger to photograph sensitive data on his screen [11]. In another case, security cameras captured the private details of Bank of America clients through the bank's windows [12]. In yet another case, sensitive personal information relating to the United Kingdom's Prince William was captured and published as a result of on-screen exposure to a bystander [13].

The risk of loss from shoulder surfing is also hurting business productivity. Figures show that 57% of people have stopped working in a public place due to privacy concerns and 70% believe their productivity would increase if they felt that no one would be able to see their screen [2].

Several techniques have been developed to limit the visual exposure of sensitive private information. The primary focus of these systems, however, has been limited to preventing the visual leakage of password entries [22, 23, 24, 25, 33, 34, and 35]. Once the user has been successfully authenticated, all accessed sensitive information is displayed in full view. Clearly, such measures are insufficient for general computing in public when the need to access sensitive information arises. Unfortunately, many techniques used to prevent visual password leaks cannot be readily generalized beyond password protection.

Previous related works include both systems that secure against observation-based attacks and those that provide similar privacy protection over network channels.

A. Visual Authentication Protection

Prior work on protection against visual exposure is focused primarily on securing the act of authentication. By far the earliest is the technique of Xing out or simply not printing entered passwords on login screens [15]. Most others can be generalized as augmentation or replacement of password entry mechanisms.

1) Password Managers

Perhaps the most common method of securing against an observation-based attack is the use of password managers. These managers are software tools that allow the user to select a predefined username and password pair from a list for entry into the login fields [14]. This also allows a user to use different passwords for different applications without the need to remember each of them individually.

2) Hardware-Based Authentication

Other related works involve external physical devices to supplement or replace the need to enter passwords. These techniques utilize specialized USB dongles [17], audio jacks [18], short-range wireless communication using NFC [19], or Bluetooth connections [20] to connect to the authenticating machine.

3) Graphical Passwords

Another technique to help guard against information leaks from visual attacks is the use of graphical passwords or Graphical User Authentication (GUA) [22]. Such techniques remove the alpha-numeric password from the equation and replace it with the use of series of images, shapes, and colors. Common techniques present the user with a series of human faces that must be clicked on in sequence [23], object sequences as part of a story [24], or specific regions within a given image that must be clicked in sequence [25].

5) Gesture-Based Authentication

Closely related to both GUA techniques and biometric solutions are gesture-based authentication techniques. These methods allow the user to perform specific tap [33], multi-finger presses [34], or swipe sequences on-screen [35] to represent a password.

6) Cognitive Challenges, Obfuscation and Confusion

Other techniques have attempted to make games of the authentication procedure [37]. Instead of a single password or phrase, these techniques utilize challenge-response questions and use of cognitive tasks to increase the difficulty of the login session [38]. Other techniques have attempted to remedy the shortcomings of password-based authentication through obfuscation and confusion to a visual observer. They utilize the hiding of cursors [39], confusion matrices [40], and recognition [41] rather than recall-based methods, to trick and confuse onlookers.

7) Alternate Sensory Inputs

Additional works utilize other biological sensory inputs to replace or augment password-based authentication. These systems can address two separate parts of the authentication process; the cue to the input, or the actual input itself.

In the first case, the additional sensory input serves as a non-observable instruction or hint to the required passphrase entry. These systems utilize audio direction [42] or tactile and haptic feedback from the vibration motors on devices [43] to provide the user with the appropriate cue for the necessary response. The user then responds with the phrase corresponding to the cue using traditional input methods.

In the second case, the auxiliary sense serves as the input mechanism itself. These systems extend GUAs by requiring sequential graphical inputs but use mechanics like eye tracking, blinking and gaze-based interaction for the user to input the graphical sequence [44]. Systems have even demonstrated the capability of using brain waves for this task; a user may only need to think a specific thought to authenticate with a system [45]. These methods are also useful alternatives for authentication of people with visual or audio sensory disabilities [46].

B. Digital Communication Channel Protection

Many protocols and systems have also been developed to handle other aspects of privacy-oriented attacks through the encryption of the digital communication channel. Transport Layer Security and Secure Sockets Layer can enhance security by providing session-based encryption [47]. Virtual Private Networks can be used to enhance security by offering point-to-point encryption to provide secure resources access across insecure network topologies [48]. Proxy servers [49] and onion routing protocols such as Tor [50] can add extra privacy by providing obfuscation of location, and anonymization of IP addresses.

Many other solutions have been developed to enhance security and privacy at the browser level. Do-not-track requests can be included in HTTP headers to request that the web server or application disable its user and cross-site tracking mechanisms [51]. Many browser extensions and plug-ins exist to block advertising [52] as well as analytics, beacons, and other tracking mechanisms [53]. Other systems alert the user when specific privacy elements are leaked [54], prevent the transmission of sensitive data without explicit user permission [55], and cryptography secure access to sensitive data outside of trusted situations [16].

C. Compared to Cashtags

Despite the various mechanisms mentioned, the visual channel remains largely open. A limited number of tools are available to obfuscate sensitive data other than during the act of authentication. All existing tools developed for encryption of data are not originally designed for such purposes.

Password-based solutions and biometrics are effective in handling visual leaks during the act of authentication, but cannot be generalized to handle other cases. No existing mechanism is in place to allow arbitrary data to be marked as sensitive. Cashtags is the only existing system that can protect general data from shoulder surfing.

Accordingly, what is needed is a more effective system and method to defend visual observation attacks on mobile devices. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above.

However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a method and system for defending against unwanted observation of an electronic device is now met by a new, useful, and nonobvious invention.

The novel method includes assigning a plurality of sensitive text values to a plurality of alias values and storing the sensitive text values, assigned alias values, and their respective assignments in a digital alias repository. Responsive to a visual display refresh event, the present invention intercepts text intended for visual display by hooking into the text-out buffer. In an embodiment of the present invention, the system is responsive to any event intended to convey information to a user by any human-perceptual output device; for example, the system might respond to an event initiating a text-to-speech function or an event initiating a haptic feedback. Such a system may intercept the text prior to transformation into audio/haptic feedback or the system may intercept the audio/haptic feedback directly.

After the text/information intended for conveyance is intercepted, the system scans the intercepted text for any sensitive text values that match those stored in the digital alias repository. Any detected sensitive text is replaced in the text-out buffer with the corresponding alias. Once replaced, the system displays the intercepted text to the user with the identified sensitive text values replaced by their respective alias values.

In an embodiment, the method further includes receiving a user request to access the digital alias repository, presenting a user with a login routine, and verifying that a user's identification and password match a predetermined user identification and password. The user is then provided with access to the digital alias repository and the system stores any updates to sensitive text values or alias values.

In an embodiment, the text is intercepted through on-screen user interface elements, such as TextView, when the text is contained in text-displaying screen widgets. In an embodiment, the text is intercepted through a web rendering engine, such as WebView, when the text is contained in a web browser. In an embodiment, the text is intercepted within graphic rendering libraries, such as through GLtext, when the intercepted text is in graphic form.

In an embodiment, each alias value is prepended with an alias identifying value. In an embodiment, the alias values may be non-unique string values with respect to other systems operating independently from one another, and with respect to a single system operating with several application-specific repositories.

In an embodiment, the system includes a plurality of alias repositories wherein certain repositories are intended for certain application. Such an embodiment includes the additional step of receiving an application identification and accessing an application-specific alias repository based on the application identification received.

In an embodiment, the alias repository is locally stored on the electronic device. In an embodiment, the alias value is ASCII text. In a certain embodiment, the data transmission is a POST or GET request.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention includes a system and method that defends against unwanted visual observation of sensitive information on the display screen of a mobile device. Sensitive information is masked with user-defined aliases (hereinafter "cashtags"), allowing the user to privately compute in public without worrying about unwanted visual observation of the sensitive information. The system is compatible with legacy features such as auto correct, and the deployment model requires no changes to applications and the underlying firmware, with a performance overhead of less than 3%.

A. Threat Model

The threat model is defined as passive, observation-based attacks (e.g., captured video or physical observation by a human). It is assumed the attacker can observe both the screen of the user as well as any touch sequences the user may make on the screen, physical buttons, or keyboards. It is also assumed that the observer cannot directly influence the user in any way.

Although sensitive information can be presented in many forms, the focus is on textual information to demonstrate the feasibility of the framework. Protecting sensitive information in other forms (e.g., images and bitmaps) is the subject of other works.

B. User Model

Figure 2:
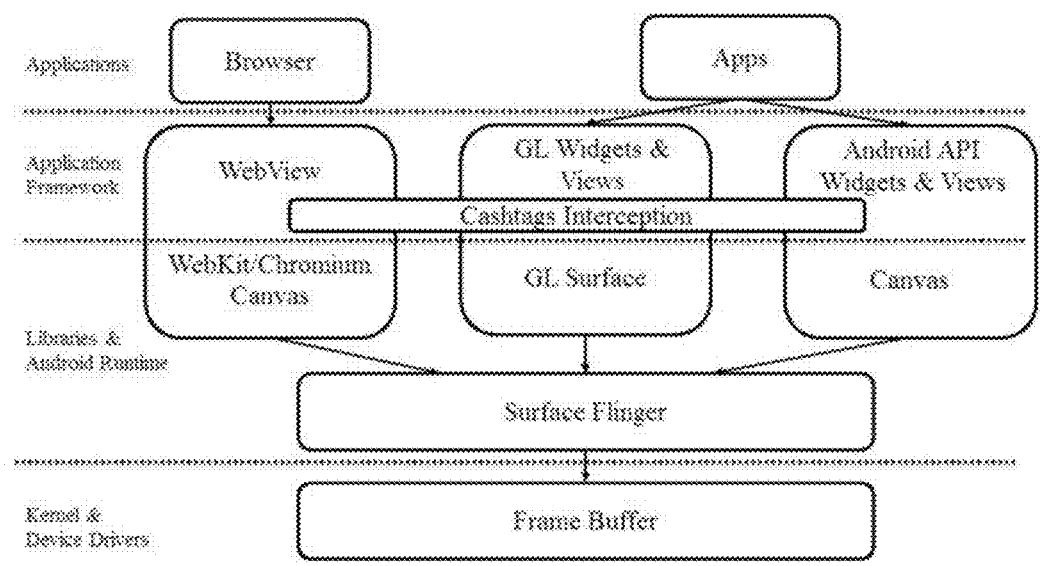
FIG. 2 is a certain embodiment of display paths for an Android platform.

Conceptually, the present invention is configured with a user-defined list of sensitive data items, each with a respective alias or a cashtag (e.g., $visa to represent a 16-digit credit-card number; see other examples in Table 1). A cashtag alias consists of a dollar sign followed by an arbitrary string of printable characters. Then, whenever the sensitive term would be displayed on screen, the system displays the pre-defined alias instead (FIG. 2.1). At the point at which the sensitive data would be used internally by the device or an app, the cashtags will be replaced by the sensitive data items represented by the alias, allowing whatever login, communication, transmission, or upload to proceed normally. In an embodiment, the alias/cashtag may have any combination of characters, numbers, or symbols that is producible on and identifiable by a computer.

In a certain embodiment, a user can directly type in a cashtag in place of the sensitive term, permitting more complex data-sensitive tasks, such as filling out an application for a credit card or loan without risk of observation from a bystander. In addition, cashtags are easier to remember than the actual information itself. For example, $visa can be used as a shortcut for entering a 16-digit credit card number.

C. Design Overview

Although conceptually simple, the design of the present invention addresses a number of major design points.

Intercepting Sensitive Data:

The present invention intercepts sensitive data items as they are sent to the display; for apps, at their common textual rendering library routines; and for users, at routines to handle software keyboards as well as physical devices (e.g., USB and wireless input devices).

User Interface:

Users can type in cashtags instead of sensitive data items to compute in public. This interface allows cashtags to be compatible with existing tools such as auto completion, spellcheckers, cut and paste, etc. Thus, users can enter the first few characters and auto complete the full cashtag.

Accessing Sensitive Data:

User-entered cashtags are converted internally to the sensitive data items before the apps access the data; this way, the system will not break applications due to unanticipated input formats.

Variants of Data Formats:

The system can leverage existing libraries to match sensitive data items represented in different formats (e.g., John Smith vs. John Q. Smith for a name).

Development and Deployment Models:

The system uses a code-injection framework. This approach avoids modifying individual apps and the firmware, while altering the behavior of the overall system to incorporate the system at runtime.

Cashtag Repository:

the mapping of cashtags to sensitive data items is stored in a centralized, password-protected repository, such as exemplary repository shown in Table 1 below:

TABLE 1

Exemplary Cashtag Repository

| Type | Actual | Alias |
| --- | --- | --- |
| Name | John Smith | $name |
| Email | jsmith@gmail.com | $email |
| Username | Jsmith1 | $user |
| Password | P@ssw0rd | $pass |
| Street Address | 123 Main St. | $address |
| Telephone | 555-111-2222 | $phone |
| Birthday | Jan. 1, 1985 | $bday |
| Credit Card | 4321 5678 9012 1234 | $visa |
| Account Number | 123456789 | $accts |

Figure 1:
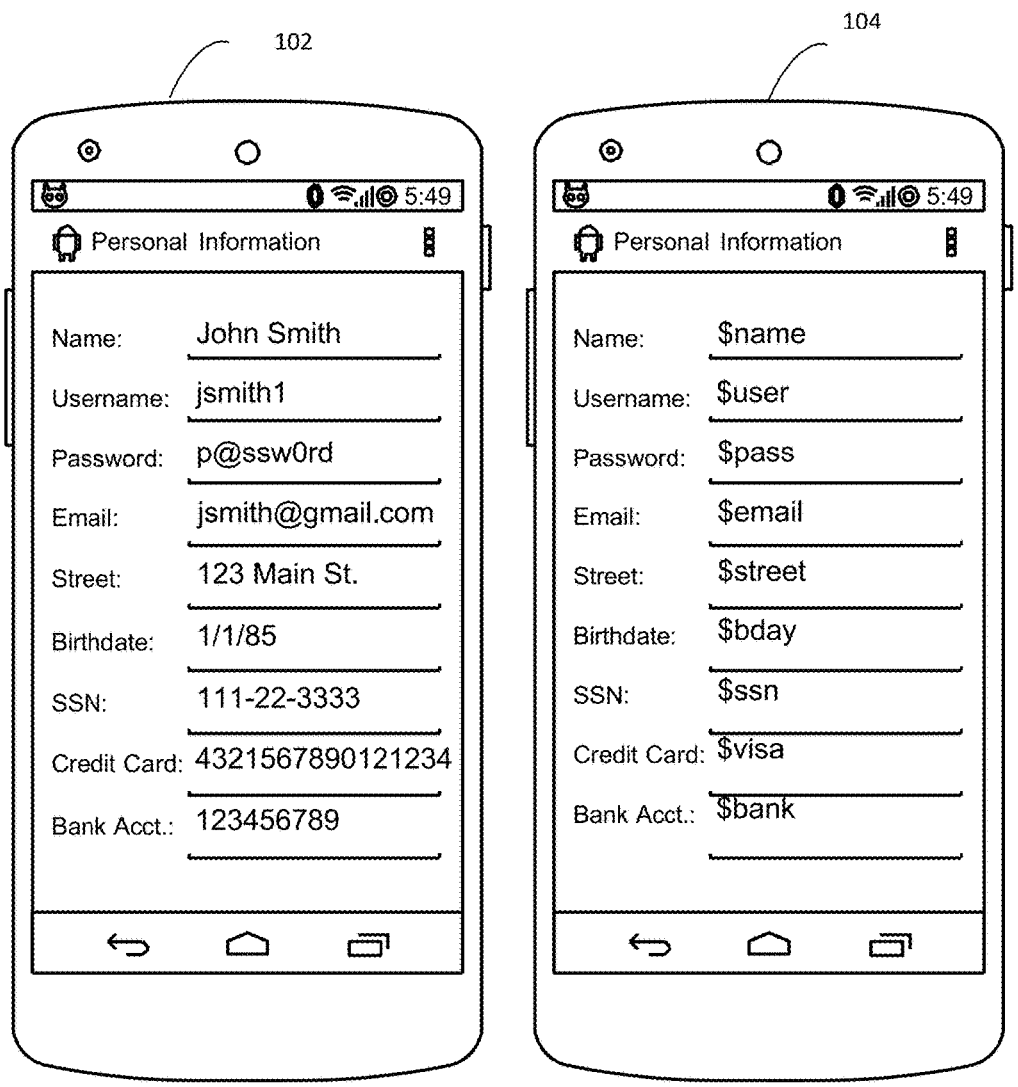
FIG. 1 depicts two mobile devices next to each other wherein the device on the left is conventional and the device on the right implements the present invention.

FIG. 1 provides an exemplary illustration of a typical mobile device 102 on the left versus a mobile device 104 using the present invention on the right. As shown, mobile phone 104 on the right allows a user to input sensitive information without the threat of unwanted visual observation of the sensitive information.

EXAMPLE

A. Intercepting Sensitive Data

Understanding how sensitive data traverses from apps to the screen through various display data paths is needed to decide where to intercept sensitive data. FIG. 2 shows various display data paths under the Android application development platform. Although iOS and Windows use different platforms, the display data paths generally can be mapped from one platform to another.

A typical app displays information on screen by invoking some user-level display or graphics library routines. Various routines eventually invoke routines in the underlying window management system (e.g., Surface Flinger for Android) before information is processed by the OS and displayed on screen.

Arguably, the window management system might seem to be a single point at which all sensitive data can be captured. Unfortunately, by the time sensitive information arrives there, some sensitive information may have been translated into bitmaps. While OCR technologies are computationally cheap enough to be used for launching shoulder surfing attacks, they are still too heavyweight for deployment in the display data path, which is critical for user interactions. In addition, replacing sensitive bitmaps with non-sensitive ones would pose other obstacles that should be avoided.

Another extreme is to intercept at the app level, where the sensitive information is introduced. Potentially, a few top apps could be modified and capture a majority of cases where sensitive information is used. For instance, custom e-mail applications or browsers could offer protection for task-specific usages. However, such solutions may restrict users to using a specific tool for a specific task. In addition, statistics show that specific app usage accounts for 86% of user time, trending away from general-purpose browsers [56]. Thus, the burden of incorporating our features could spread to a much wider range of app developers, which is undesirable. Further, new apps and updates to old apps would not automatically include the desired protection.

For the reasons above, an intermediary ground is needed to intercept sensitive data within a few key display and graphics library routines.

B. User Interface

In the early user-interface design, a user defines English-like aliases in a repository to indicate sensitive data items that they wish not to be shown (e.g., use John to represent Joe). To discern these aliases when processing, an alternative input channel was used to mark them. This initial design turned out to be problematic in a number of ways.

One way to achieve this effect is to add a separate software keyboard that a user would use whenever the user wanted to input sensitive information. Essentially, this keyboard would be an app with elevated privilege to offer input across applications, and it would be easier to port across platforms, deploy, install, and update. However, changing keyboards amidst a stream of input is cumbersome in practice. This method would result in the loss of functionality offered in default keyboards, including swipe-based inputs, emoticon support, auto correction, and custom dictionaries.

One-step further is to replace the default keyboard with one that provides ways (e.g., a screen tapping sequence) to switch modes between normal entries with sensitive entries, which would retain legacy functionalities, such as auto correction. The user learning curve would be less steep, since no keyboard switching would be involved. On the other hand, the development effort of this approach would be significantly higher, and it would be harder for novice users to install our software, namely, by carrying out the replacement of the default keyboard.

Direct Input of Cashtags:

While there are other input interface options than these, the need to perform cumbersome switches of input modes so that the aliases can appear as normal text seems superfluous in many contexts (e.g., using "visa" to represent the 16-digit credit card number).

Thus, the use of cashtags was explored, where aliases are prepended with a $ sign, to represent sensitive information. By doing so, a user can directly enter cashtags, and the mode change is explicitly encoded in the cashtag alias (e.g., use $fname to represent John and $gmail to represent jsmith@gmail.com). This method can leverage the existing custom dictionary for auto completion, which makes it easier for the user to remember and input cashtags. This method can also utilize standard application level development techniques, opening up the range of supported device platforms and decreasing development and installation efforts.

Direct Input of Sensitive Information:

Another alternative (albeit with some potential for information leak) is for a user to attempt to enter the initial characters of a sensitive data item. As soon as the auto completion detects that Jo, for example, is likely to mean Joe, it will be automatically masked with the cashtag $John. The user then can choose $John and proceed.

Additional Cashtags semantics: Recursion is supported, so $signature can represent $first_name, $last_name, and $gmail, which in turn maps to John, Smith, and jsmith@gmail.com. We detect and disallow circular cashtags mappings (e.g., use $John to represent $Joe, and $Joe to represent $John).

C. Accessing Sensitive Information

One design issue involves the timing for converting cashtags back to the sensitive data for access by apps. Normally, when an app wants to access the sensitive information and sends it back to the hosting server, the conversion must be performed prior to access, so that the app will not be able to cache, store, or transmit the cashtags. The main concern is that cashtags may not adhere to the type or formatting constraints and break an app inadvertently.

Another consideration is that the cashtags are actually entered by the user, not just pre-populated by the app. In the case of the later, a malicious app can extract sensitive information just by displaying cashtags.

There are also certain exceptions where it is desirable to directly operate on cashtags instead of the sensitive information. For example, the auto completion task will auto complete cashtags ($fn to $fname), not the sensitive information it represents. By doing so, the handling of text span issues is simplified because cashtags usually differ in text lengths when compared to the sensitive information they represent.

D. Variants of Data Formats

Sensitive data may be represented in multiple formats. For example, names can be represented as combinations of first, last and middle initials (e.g., John Smith; John Q. Smith; Smith, John Q). Accounts and social security numbers can be represented using different spacing and/or hyphenation schemes (e.g., 123456789; 123-45-6789; 123 45 6789). Fortunately, existing regular expression libraries (java.util.regex.*) can be leveraged to perform such matching.

Another issue involves the type restriction of the input field. For example, a number field (e.g., SSN) may prevent the use of cashtags ($ssn). To circumvent these restrictions, we allow users to define special aliases (e.g., 000-00-0000) in place of cashtags to represent certain types of sensitive information (e.g., social security numbers).

E. Deployment and Development Models

To avoid modifying individual applications, two options for providing system-level changes were considered: (1) custom system firmware images (ROMs) or (2) code-injection frameworks (e.g., Android Xposed)

Complete control of the operating system is provided by utilizing a custom system firmware image. This approach assumes that the full source is available for modification. In addition, ROM-based solutions can offer a more unified testing environment. However, the changes would be restricted to device-specific builds; only hardware for which the source is explicitly built would have access to the modified system. This also limits user preference by restricting use only for a specific system image. It would additionally require regular maintenance, and would break vendor over-the-air update functionality.

Instead, a code-injection framework was used, which dynamically introduces overriding routines as a library, incorporated into execution prior to the starting of apps. Code injection offers more streamlined development, as standard user application development tools can be used. In addition, these modules can be more easily deployed since they can be distributed as applications. Because code injection only relies on the underlying system using the same set library, the deployment is much more portable and less coupled with the exact versions and configurations of system firmware.

F. Cashtags App and Repository

Cashtags aliases and sensitive data items are maintained in an internal repository. The Cashtags app coordinates the interactions between various apps and the repository. The app also provides password-protected access to add, edit, remove, import, and export sensitive terms and corresponding cashtags.

Cashtags provide per-application blacklisting, excluding specific applications from being code-injected (or activated) with cashtag-replacement code. For example, the cashtag repository itself must be excluded due to circular dependencies. To illustrate, suppose a cashtag entry maps $first_name to Joe. If Cashtags is enabled, the screen will show that $first_name is mapped to $first_name. When the entry is saved, Joe will be mapped to Joe. Thus, Cashtags is always excluded from servicing itself. Individual application packages can be excluded for lack of relevance to sensitive information exposure or for performance issues (e.g. games, application launchers, home screens).

Implementation

Cashtags were prototyped on the open-source Android platform. The code injection framework allows Cashtags to operate on any Android device with the same display and graphics libraries and root access. This section will first detail the display data path in the Android context, then explain the code-injection framework, and finally discuss the details of how various display data paths are intercepted and how cashtags are stored.

A. Android Display Elements

FIG. 2 provides a top-level view of various ways Android apps and browsers display information on the screen. This section provides further background on Android terminologies. The corresponding terminologies for iOS and Windows are listed in Table 2 below:

TABLE 2

Widget Terminology on OS Platforms

|  | Android | Apple | Windows |
| --- | --- | --- | --- |
| Text Labels | TextView | UITextView | TextBlock |
| OpenGL Text | GLES20Canvas | GLKView | Direct3D |
| Editable Text | TextView | UITextView | TextBlock |
| Webapp Text | WebView | UIWebView | WebView |
| Browser/Web Views | WebView | UIWebView | WebView |

Android on-screen display is composed of views, layouts, and widgets. View is the base class for all on screen user interface components. All visual elements are descendants of this base class.

Widgets: The term widget is used to describe any graphic on-screen element. Different widgets can be used to display static text labels (e.g., TextView), user input boxes (e.g., EditText), controls (e.g., Buttons), and other media (e.g., ImageView).

Views are organized into ViewGroups, the base class for all screen layouts. Layouts are arrangements of views within vertical or horizontal aligned containers (e.g., LinearLayout), or arranged relative to other views. Nesting of ViewGroups and Layouts allows more complex custom composites to be defined.

Figure 3:
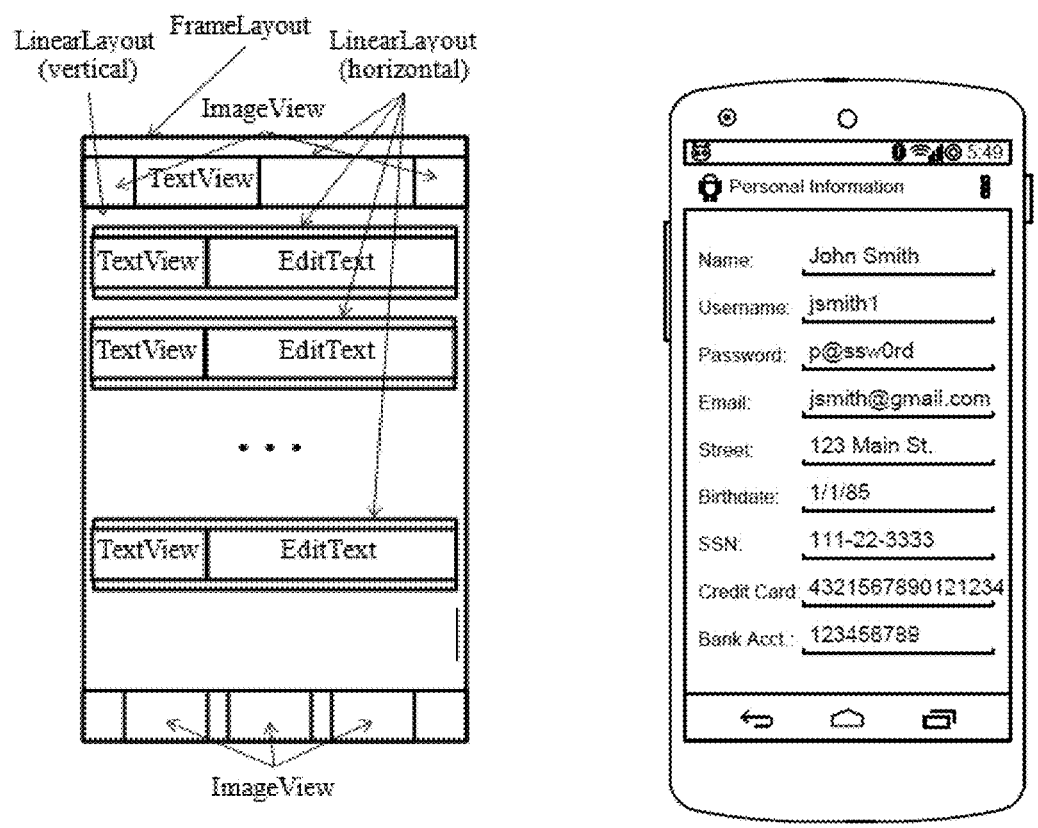
FIG. 3 is a decomposition of on screen views, layouts, and widgets of a simple app input forms.

Collectively, this tree of layouts and widgets is called the view hierarchy. When the screen canvas is drawn, the view hierarchy is converted from logical interface components into a raw screen bitmap. FIG. 3 shows a simple user input form and its composition of various widgets and layouts.

Text rendering: Text can be rendered on screen through several mechanisms (FIG. 2), the most common being through the TextView widget. Fonts, styles, colors, and so forth can be applied to specify how these are displayed. An EditText is an extension of the TextView that provides an interface for text input. This input can come from the user via the on-screen software keyboard, (integrated, plugged, or wirelessly connected) hardware keypads, voice input, gestures, and so forth. Like TextView, these widgets can be pre-filled with text by the app internally. They can also be set through suggestion or auto-correction interfaces.

Text can also be rendered on screen via OpenGL Canvas or other graphic rendering libraries. Unlike the EditText, this class does not inherit from the base TextView, although similar interfaces do exist.

Text can further be rendered on-screen from HTML and Javascript via browser rendering engines such as WebKit or Chromium. This includes mobile web browsing applications as well as many other cross-platform web app APIs such as Phonegap, Apache Cordova, and JQuery Mobile.

B. Android Code-Injection Framework

Cashtags uses the Android Xposed code-injection framework to intercept and modify the behavior of text widgets at runtime, without being tied to specific system firmware images. The development cycle is also accelerated by short-circuiting the need to perform complete device firmware rebuilds from scratch.

Underneath the hood, whenever an app is started, Android forks off a new virtual machine. The Android Xposed framework allows additional overriding library routines to be inserted into the Java classpath, prior to the execution of the new virtual machines. Thus, the overall system behavior is altered without modifying either the apps or the underlying firmware.

Individual class methods can be hooked, allowing injected code to be executed prior to a base method calls, following the completion of the base method call, or in place of the base method. Private or protected member fields and functions can also be accessed and modified, and additional fields or functions can be added to the base class or object granularity. Below is an exemplary API provided by Xposed for injecting method, constructor, and fields. It should be noted that XXX denotes the specified data type, boolean, int, float, etc.

hookAllMethods( )/hookAllConstructors( )
findMethod( )/findConstructor( )/findField( )
callMethod( )/callStaticMethod( )/newInstane( )
getXXXField( )/setXXXField( )
getStaticXXXField( )/setStaticXXXField( )
getAdditionalXXXField( )/setAdditionalXXXField( )

Figure 4:
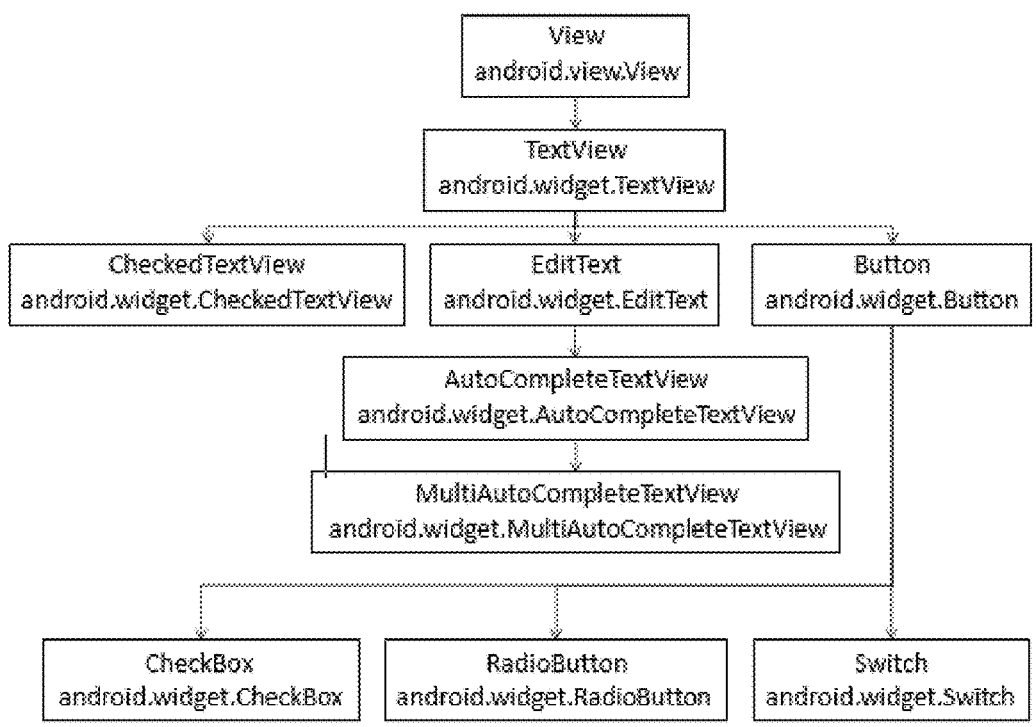
FIG. 4 is a simplified Android screen widget view hierarchy.

C. Sensitive Data Intercepting Points

Where and how to intercept sensitive information can be determined with the background of Android display data paths (FIG. 2) and the code-injection framework. Since all text-displaying screen widgets are descendants of the TextView class (FIG. 4), TextView (android.widget.TextView) was hooked to intercept static sensitive text. For input, EditText (android.widget.EditText) was hooked to capture sensitive data or cashtags entered via on-screen software keyboard, (integrated, plugged, or wirelessly connected) hardware keypads, voice input, and gestures. For display through the OpenGL libraries, GLtext (android.view.GLES20Canvas) was intercepted. For browsers, Webview (android.WebKit/WebView) was intercepted.

D. TextView

Below is a simplified version of the implementation of the TextView widget in the Android API, present since version 1 of the Android SDK.

```
public class TextView extends View implements
    ViewTreeObserver.OnPreDrawListener {
  . . .
  private CharSequence mText;
  private CharSequence mAlias:
  . . .
  public CharSequence getText( ) {
    return mText;
  }
  . . .
  private void setText(CharSequence text,
    BufferType type, boolean notifyBefore, int oldlen) {
    . . .
    mBufferType=type;
    mText=text;
  }
  . . .
}
```

The getText( ) and setText( ) methods of the TextView are hooked and modified (the setText( ) method in TextView is inherited by EditText, to be detailed later). The mAlias was also added to map the sensitive text to the corresponding cashtag.

Figure 5:
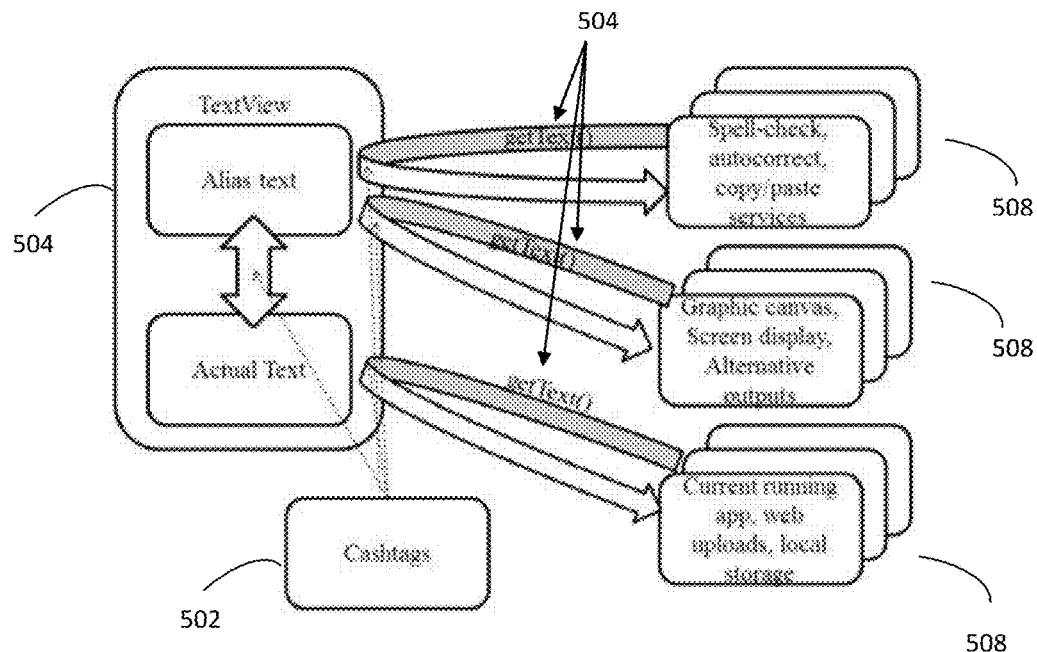
FIG. 5 is a graphical display of interactions among Cashtags, TextView, and other software components, and highlights how getText( ) returns cashtag or actual text depending upon the service making the request.
Figure 6:
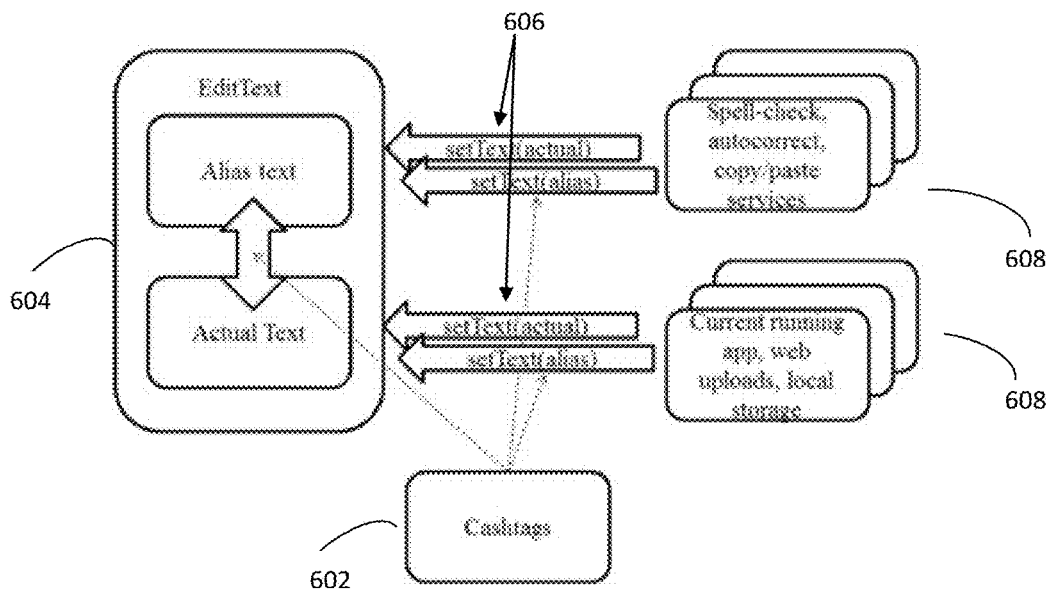
FIG. 6 is a graphical display of interactions among Cashtags, EditText, and other software components, and highlights how setText( ) returns cashtag or actual text depending upon the service making the request.

FIGS. 5 and 6 show how Cashtags 502, 602 interacts with TextView 504 and EditText 604 objects. When these getText( ) and setText( ) methods, 506 and 606, respectively, are called by the app or through system processes like auto correct or to be rendered on screen, Cashtags 502, 602 will determine whether to return the alias or the sensitive data, depending on caller 508, 608.

Figure 7:
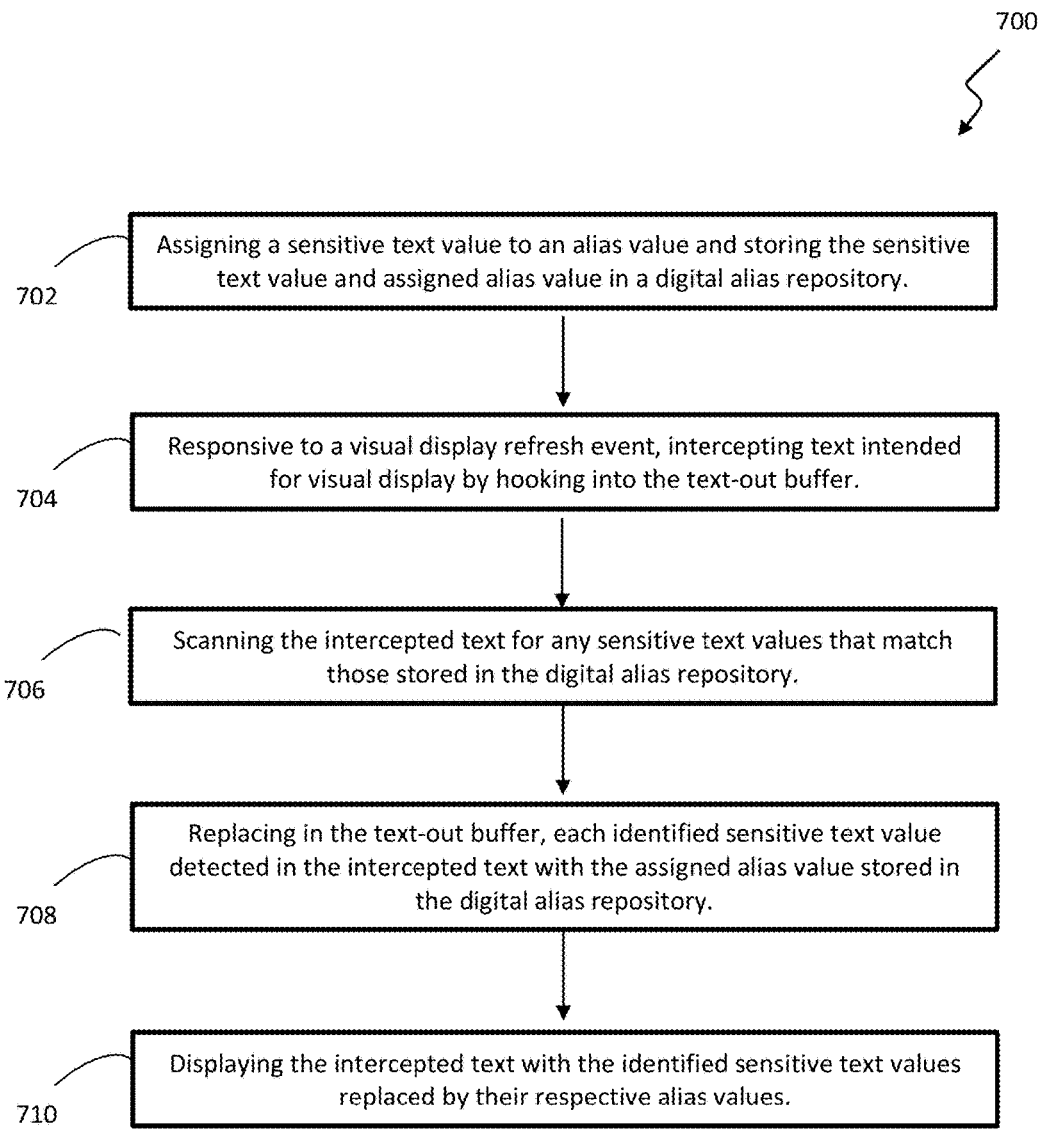
FIG. 7 is a flow diagram of a certain embodiment of the present invention in response to an information conveyance event.

FIG. 7 illustrates an exemplary flow diagram of one embodiment of cashtag system, generally denoted as reference numeral 700, responding to a user visual display request. The system first assigns a plurality of sensitive text values to a plurality of digital alias values (cashtags) and then stores the values in an alias repository 702. Responsive to a visual display refresh event, the system intercepts the text of an application by hooking into the text-out buffer 704. The intercepted text is scanned for sensitive text that matches the sensitive text stored in the repository 706. Any detected sensitive text in the intercepted text is replaced with the corresponding alias stored in the repository 708. The system then displays the intercepted text with the sensitive text replaced by the corresponding aliases 710.

E. EditText

Figure 8:
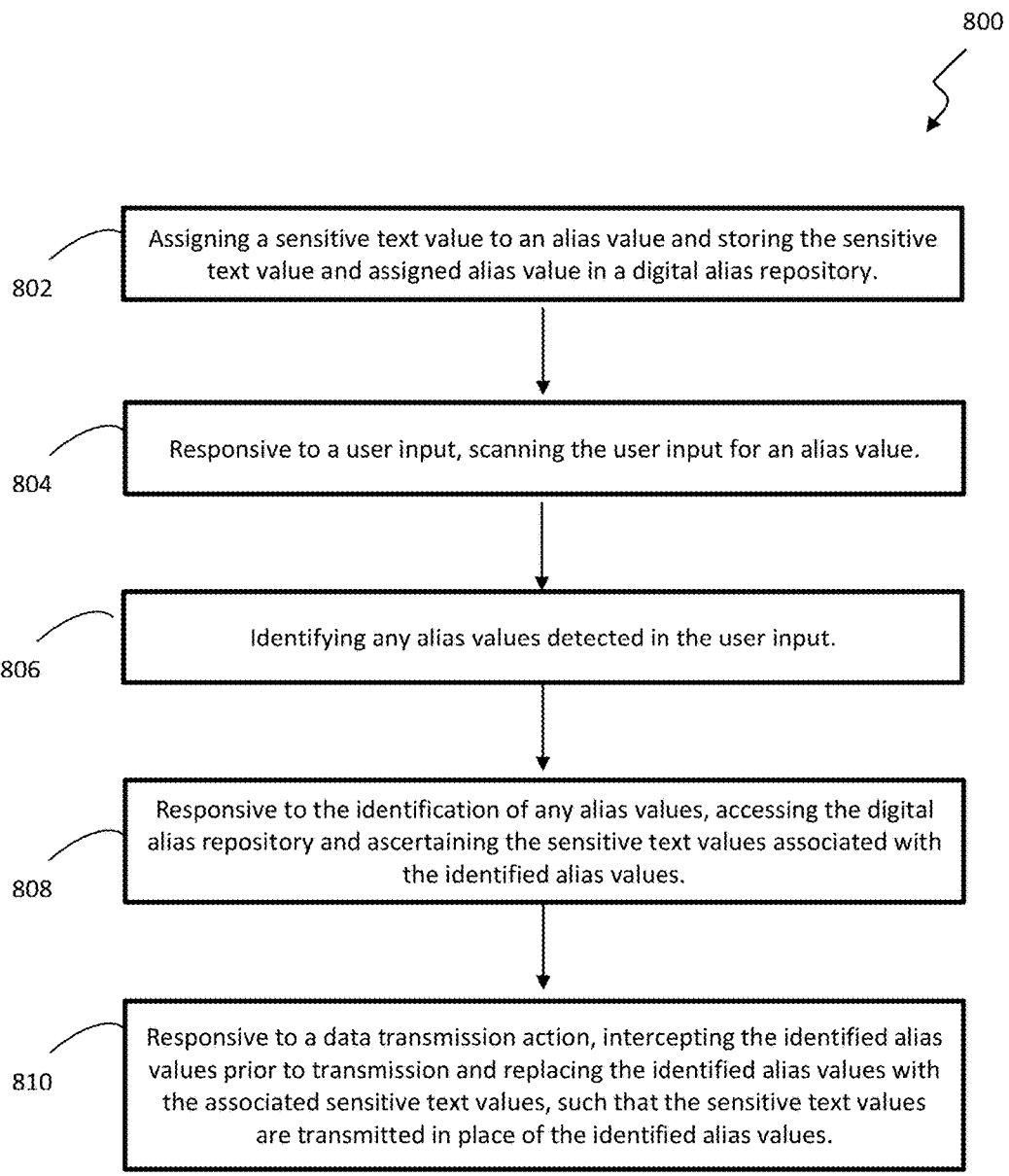
FIG. 8 is a flow diagram of a certain embodiment of the present invention in response to a user input.
Figure 9:
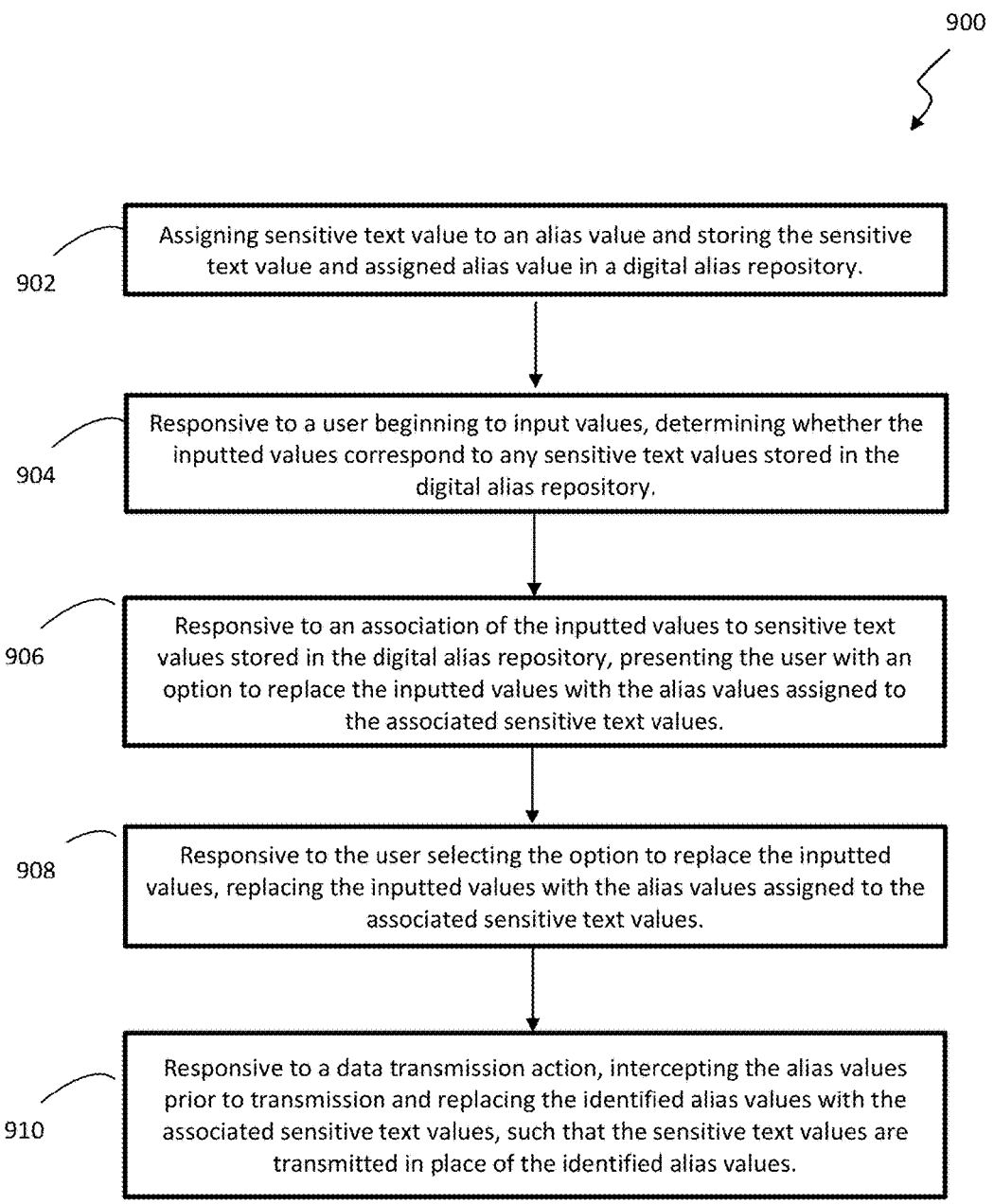
FIG. 9 is a flow diagram of a certain embodiment of the present invention in response to a user input.

EditText objects are more complex since additional actions can be performed by the user, app, or system to modify on-screen text. FIG. 8 illustrates an exemplary flow diagram of an embodiment of the cashtag system, generally denoted by reference numeral 800, responding to a user input. The system assigns a plurality of sensitive text values to a plurality of digital alias values and then stores the values in an alias repository 802. Responsive to a user input, the system scans the user input for an alias value 804, and identifies any detected aliases 806. Responsive to an identification of an alias, the system accesses the alias repository and determines the sensitive text corresponding to the alias 808. If a data transmission action occurs, the alias is intercepted and replaced with the associated sensitive text, such that the sensitive text values are transmitted in place of the identified alias values 810. FIG. 9 illustrates another exemplary flow diagram of an embodiment of the present invention, generally denoted by reference numeral 900, responding to a user input. The system assigns a plurality of sensitive text values to a plurality of digital alias values and then stores the values in an alias repository 902. Responsive to a user beginning to input values, the system scans the user input to determine whether the inputted values correspond to any sensitive text values 904. Responsive to an association of the inputted values to sensitive text values stored in the digital alias repository, the system presents the user with an option to replace the inputted values with the alias values assigned to the associated sensitive text values 906. If the user selects the option to replace the inputted values, the system replaces the inputted values with the alias values assigned to the associated sensitive text values 908. If a data transmission action occurs, the alias is intercepted and replaced with the associated sensitive text, such that the sensitive text values are transmitted in place of the identified alias values 910.

For cases where the system or app has pre-populated a text box with input, the TextView injection handles the cashtag replacement. Since the EditText class extends from the TextView base class, this functionality is provided through inheritance. This is also the case for nearly every other on-screen text widget as they are also hierarchically descendant from the base TextView.

User input can be entered through software keyboards or through physical devices. In both cases, cashtags operates similar to, and through the same interface, as the auto-correct service. This TextWatcher (android.text.TextWatcher) interface handles events when on-screen text has been modified. EditText internally maintains an array of these TextWatcher event handlers. Cashtags, as one of these handlers, is activated after any character is modified within the text field.

This functionality is also achieved through the view OnFocusChangeListener (android.view.View.OnFocusChangeListener). This event handler works at the granularity of the full text field rather than individual character of the TextWatcher. This is more efficient, since the text replacement only occurs once per text field. It does, however, risk additional on-screen exposure of sensitive information, since direct input of actual sensitive terms would remain on-screen as long as the cursor remains in that text field. Input of cashtag aliases does not have this risk and further reduces any partial exposure during term input.

In both cases, the constructor of the EditText class is hooked and the respective OnFocusChangeListener or TextWatcher is attached. User settings allow activation of either or both options within the app settings.

F. OpenGL Canvas

The implementation solution for OpenGL ES Canvas is quite similar in simplified form to the base TextView only with different parameter types. The only distinction is that no accompanying getText( ) equivalent is present in this object, so no additional manipulation is necessary beyond drawText( ).

G. WebView

Distinct from the previous screen widgets, rendering occurs independently of the native UI data path via underlying WebKit or Chromium browser engines. The relevant interception points for screen rendering for these are all below the accessible Android/Java layer and are not able to be code-injected though the same mechanisms used for previous screen widget cases. Using custom compilations of the browser engines with similar widget display interception was explored, but abandoned for portability concerns.

Instead, WebView interception is handled similarly to a web browser plug-in. This decision maintains the portability goal of the system design.

Cashtags intercepts web rendering immediately before it is first displayed on-screen. The HTML is pre-processed with JavaScript to extract the DOM. Cashtags iterates over the text nodes and makes the appropriate text replacements of sensitive data to corresponding cashtags.

Other options were explored using specific browser and proxy requests through the web server. However, all apps that use cross-platform frameworks (Phonegap, Apache Cordova, JQuery Mobile, etc.) run locally and could not easily be piped though this service. For this reason, we favored the plug-in approach over other alternatives.

H. Cashtags Repository

Sensitive terms are stored as encrypted SharedPreference data, which uses AES encryption from the Java Cryptography Architecture (javax.crypto.*). This structure is accessed by enabled apps through the XposedSharedPreference interface.

Evaluation Methods

Cashtags was evaluated for how well the intercepted points prevent specified information from being displayed on screen, verified by screen captures and OCR processing. This coverage was measured by enumerating common ways sensitive text can traverse to the screen. We also evaluated user input through popular apps, making sure that cashtags correctly reverted to the sensitive data items when accessed by apps. Finally, we evaluated the performance overhead of cashtags.

A. API Coverage Evaluation

The first test is for Android API coverage. The TextView and EditText display data paths were focused on since they account for more than 86% of usage hours for mobile devices [56]. The selected sensitive information (Table 2) is based on the Personally Identifiable Information (PII) chosen categorically based on US government and NIST standards [59]. All combinations of input phrase type (e.g., numbers, strings, etc.), case sensitivity, common widget, layout, theme, and other configuration options were enumerated for these data paths. Each combination was used to demonstrate that the PII terms are not displayed on screen from the app internally, as user input of the sensitive data directly, or as user input of cashtag alias. In all three cases, it was demonstrate that the PII term is correctly returned from cashtags when used internally by the app.

This totals 1,728 tests for static text widgets and inputs, with 526 additional test cases for widgets that permit user input via both software keyboards as well as physical devices (on-board hardware, USB or wireless input devices). The full list of configurations is shown below.

Input Phrase Type (4):
Alphabetic phrase, numeric phrase, alphanumeric phrase, Alphanumeric with symbols.
Phrase Case (2):
Case Sensitive Text, Case In-sensitive Text
Widget Type (9):
TextView (android.widget.TextView),
CheckedTextView(android.widget.CheckedTextView), Button
(android.widget.Button),
CheckBox (android.widget.CheckBox), RadioButton (android.widget.RadioButton), Switch (android.widget.Switch),
EditText (android.widget.EditText), AutoCompleteTextView
(android.widget.AutoCompleteTextView),
MultiAutoCompleteTextView
(android.widget.MultiAutoCompleteTextView)
Layout Type (2):
LinearLayout (android.widget.LinearLayout), RelativeLayout
(android.widget.RelativeLayout)
Theme Type (3):
Default theme, System theme, User-defined theme.
Generation Method (2):
Static XML, Dynamic Java
Lifecycle Type (2):
Activity-based lifecycle, Fragment-based lifecycle For each combination of the above, the Android Debug Bridge [60] and UIautomator tool [36] is used to capture device layout view hierarchies and screenshots of each case. The contents of the actual and cashtag fields within the view hierarchy XML are compared for conversion correctness. The device screenshot is processed using Tessseract OCR [21] and confirms if the actual PII term has been properly masked on screen.

For each combination, it was demonstrated that both text input as an actual sensitive term and cashtag are correctly converted to the actual sensitive term when accessed internally by the app. This scenario was emulated and the remote verification was performed since the access of sensitive data within the app normally involves remote actions. Once screen processing was completed, the app accessed the text fields and uploaded to Google Sheets/Form. The uploaded actual sensitive items and cashtag submissions were compared for accuracy based on expected values.

The results show that cashtags behaves correctly for all test cases. For each test case, cashtags identified input containing sensitive data in both actual and cashtag form, prevented the display on screen of the sensitive term, and determined correctly when to convert back to the sensitive data.

B. App Coverage Evaluation

The Google Play market has millions of published applications accessible by thousands of different hardware devices, making the enumeration of all possible users, devices, and application scenarios infeasible. Thus, a representative subset of popular apps was chosen to demonstrate app coverage of cashtags. Categorically, these application types are email, messaging, social media, cloud and local storage, office, and finance. The selected apps, arranged according to these categories are provided below. These apps were selected using download metrics from the Google Play marketplace, excluding games and utility apps for lack of relevance in terms of displaying sensitive data on screen. The presence of a form of external verification was also used in the application selection. Apps typically bundled with mobile devices were also tested for correct operation.

The operation performed on each is based on a commonly performed use case or task for each category. The operation performed for each category and respective app is shown below.

Email: AOSP Email, Gmail, K9 Mail

A user reads an email containing a sensitive term and its corresponding cashtag. A cashtags-enabled system should display the email with two instances of the cashtag.

A user composes an email with a sensitive term and its cashtag. A remote system not running cashtags should display the email with two instances of the sensitive term.

Messaging: Messaging, Google Hangouts, Snapchat:

A user reads a message containing a sensitive term and its cashtag. A cashtags-enabled system should display a message containing two instances of the cashtag.

A user composes a message with a sensitive term and its cashtag. A remote system not running cashtags should receive the message containing two instances of the sensitive term.

Social: Facebook, Twitter, Google+:

A user reads text containing a sensitive term and its cashtag from tweet/post/update. A cashtags-enabled system should display the tweet/post/update containing two instances of the cashtag.

A user composes a new tweet/post/update with a sensitive term and its cashtag. A remote system not running cashtags should receive the tweet/post/update with two instances of the sensitive term.

Storage: Dropbox, MS OneDrive, File Manager:

A user opens an existing file containing a sensitive term and its cashtag. A Cashtags-enabled system should display the file containing two instances of the cashtag.

A user creates a file with a sensitive term and its cashtag. A remote system not running Cashtags should see the file containing two instances of the sensitive term.

Office: GoogleDocs, MS Office Mobile, QuickOffice:

A user reads a document containing a sensitive term and its cashtag. A Cashtags-enabled system should display the document with two instances of the cashtag.

A user creates a document containing a sensitive term and its cashtag. A remote system not running Cashtags should see two instances of the sensitive term.

Finance: Google Wallet, Paypal, Square:

A user reads a document containing a sensitive term and its cashtag. A Cashtag-enabled system should display the document with two instances of the cashtag.

A user creates a document containing a sensitive term and its cashtag. A remote system not running Cashtag should see two instances of the sensitive term.

Cashtags using test cases from market apps shows a correct behavior for 97% of task and app combinations, except the MS Office Mobile tests. The reason these tests do not work is due to the custom View used for the primary user interaction. This View (id: docRECanvasHost) is not a descendant of an EditText so is not intercepted by Cashtags. All other apps tested have user input through an EditText, or a custom class inheriting from an EditText. Custom views beyond this scope could be made to work with Cashtags using case-specific handling for the internal functions and parameters that map to the equivalent EditText function.

C. Overhead

In terms of overhead, Cashtags was evaluated based on the incremental lag on the system. To perform this test, a modified version of the Android API coverage test (Section A) was run with and without Cashtags enabled. Screenshots, layout hierarchy dumping, and all other non-essential automation elements were removed prior to test execution. Test execution durations are compared, and additional incremental lag introduced by the system is calculated. This test is run with and without the remote data verification to determine the effects of network lags on our system overhead.

Figure 10:
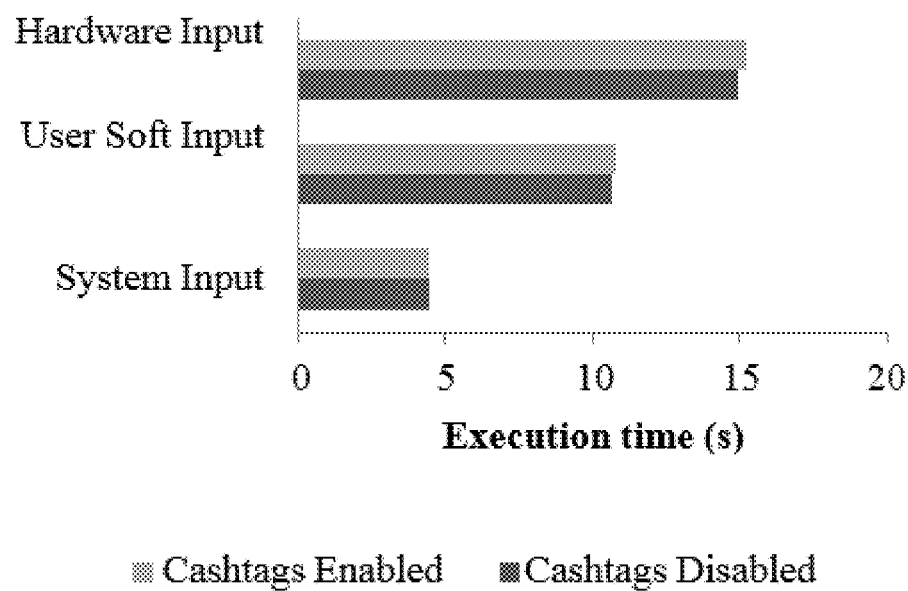
FIG. 10 is a comparison of mean app task execution time with and without Cashtags enabled, using system, software and hardware text input with web request for tests.
Figure 11:
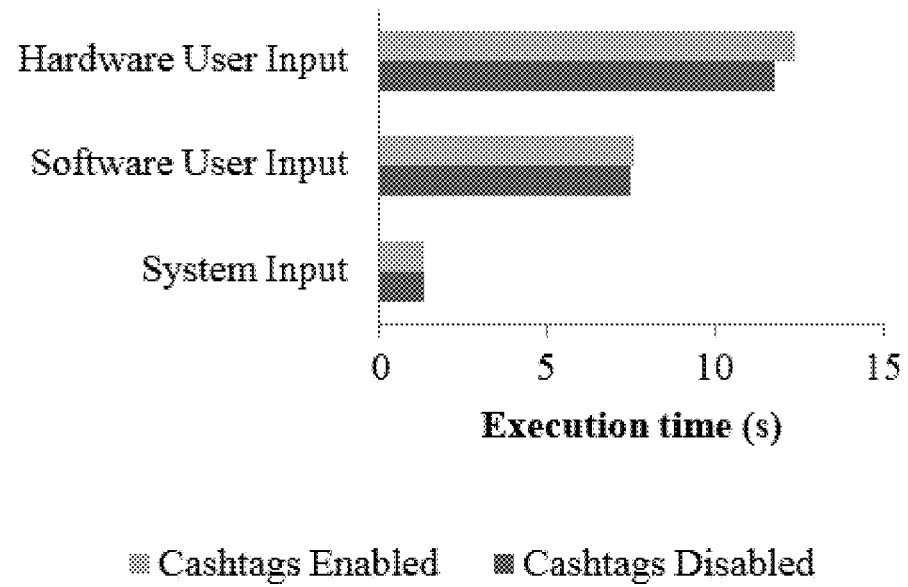
FIG. 11 is a comparison of mean app task execution time with and without Cashtags enabled, using system, software and hardware text input with web request for tests excluding the time consuming remote verification.

FIG. 10 show the Cashtags system incurs an average 1.9% increase in test execution duration. For tests including remote verification, Cashtags incurred an average of a 1.1% increase over baseline tests. For tests excluding the time consuming remote verification, FIG. 11 shows that Cashtags incurred an average of 2.6% over baseline. Therefore, under such conditions, the additional overhead of Cashtags would not be perceivable to the user.

Figure 12:
FIG. 12 is a comparison of mean app task execution time with an increasing number of cashtag entries, using system and user inputs with web request for tests.
Figure 13:
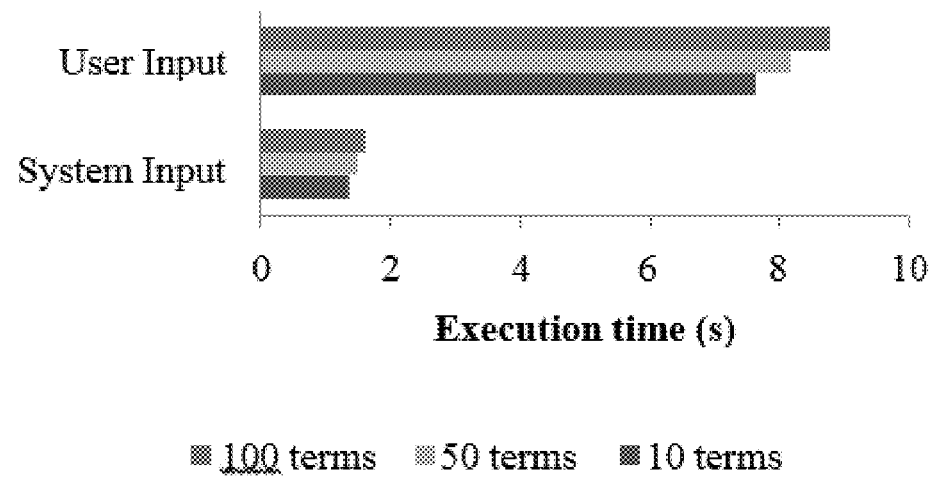
FIG. 13 is a comparison of mean app task execution time with an increasing number of cashtag entries, using system and user inputs without web request for tests without the task inclusion of a web request.

Testing was also repeated using more cashtag entries, with 50 and 100 items, which is significantly higher than the list of terms specified by PII. FIG. 12 and FIG. 13 show the results of these test runs for both system and user input data, using tests with and without the task inclusion of a web request. Due to the current data structure, the performance degrades linearly as the number of cashtags entries increases. However, the data structure can easily be replaced to make the increase sublinear.

Figure 14:
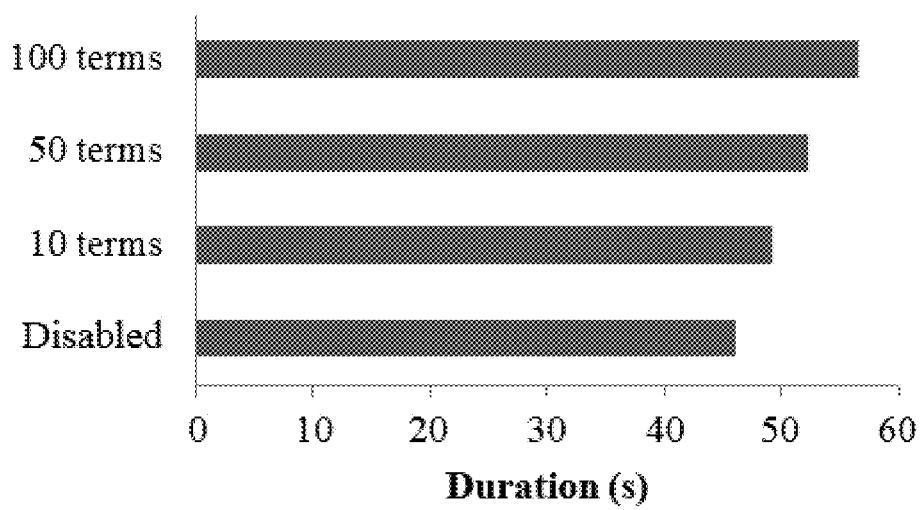
FIG. 14 is a comparison of device startup times with a varying number of cashtag entries and with system disabled.

Cashtags is additionally evaluated for boot time overhead. Changes to the Cashtags repository currently require reboot to take full effect. While this operation is not in the common critical path, the additional overhead for this operation is relevant. The results of the boot lag are shown in FIG. 14.

VII. Discussion & Limitations

A. Coverage Limitation

Cashtags widget-level text manipulation works for apps that use standard text rendering methods. However, should developers deviate from such standards and create display data paths that do not inherit from the base text widgets, cashtags would not capture such cases. Still, the additions required to incorporate these custom methods to work within cashtags would be minimal if knowledge of the custom text display functions and parameters were provided.

B. Common Name Issue

Commonly occurring names can result in certain side effects. Consider a user John Smith, with cashtag aliases of his name: John→$fname, and Smith→$lname. Therefore, all on-screen instances of John are masked as $fname. Now, John opens his mobile browser and googles for John Addams, John Travolta, or John Williams. All returned search results would be displayed with on-screen representations as $fname Addams, $fname Travolta, or $fname Williams, respectively.

While this may or may not be acceptable to the user, it could also have the unintended consequence of inadvertently visually leaking private data. If an on-looker was able to observe the above search queries in the situation above, and was aware of the operation of cashtags, they might be able to derive the sensitive data from context; in this case, determining that the user making the searches is named John. This limitation is isolated to common phrases; most instances of numerical phrases would not be relevant to this issue.

C. Data Formatting

Data formatting and types is another issue. Many cases are handled through simple transformations of text fields, including the removal of spaces and symbols, and capitalization mismatches. However, on-screen data that expands between individual TextViews is not recognized, e.g., input fields for a credit card split into parts rather than combined into a single field. This could be handled by cashtags if each part of the credit card number were individually added to the repository.

In its current form, cashtags is designed to protect against privacy leaks for the device owner. However, modification could be made to provide more generalized protection from on-screen data leaks, especially for business use cases. Many professions regularly access lists of data containing sensitive data elements. This use case is becoming more commonplace, as progressively more computing is being performed on mobile devices. Additional processing of text elements for specific patterns of text and other data could be applied to contextually determine which data fields may contain sensitive data. These fields could then be masked accordingly.

A certain embodiment of the may improve the scalability of the sensitive data repository by disabling certain widgets unlikely to contain sensitive information. The current implementation is optimized for coverage rather than performance. Disabling of specific classes of widgets unlikely to contain sensitive data is one solution. In addition, more efficient text processing methods and data structures can be used.

An embodiment may include the remote synchronization of cashtags. Updates to sensitive actual and alias lists could be propagated to other devices automatically. Cashtags could also be modified to provide shared access for multiple users. Permissions could allow a user to share a cashtag for use by another without disclosing the sensitive data. In addition, this method would provide improved redaction of access to shared sensitive resource.

Cashtags is a first step toward protection against visual leaks of on-screen data. The system demonstrates that it is possible to perform most mobile computing tasks in public locations without exposing sensitive personal information. The evaluation of the system shows that this is accomplished efficiently, with minimal perceived overhead. The app coverage test confirms that the system is general purpose and maintains full functionality with nearly all tested common use cases. These results suggest that cashtags will likely also work on most other mobile apps, providing unified, device-wide protection against shoulder surfing.

The adaptability of the present invention enables the system to hook into any peripheral output device to replace sensitive information with an alias. For example, an embodiment of the present invention may be implemented with audible software, such as text-to-speech, to aid the visually impaired. Such an embodiment would "read" aliases in place of sensitive information. In addition, an embodiment of the present invention may be implemented through haptic feedback, such that the system provides an alias feedback in place of feedback pertaining to sensitive information.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

Alias Identifying Feature is any identifiable attribute or value that distinguishes an alias from any surrounding information.

Data Transmission Action is an action resulting in the transmission of data on the display screen to either a client-side or a server-side program.

Peripheral Output Device is a device used to put information into or get information out of a computer.

Refresh is a display screen update.

Sensitive Text is a piece of personal information an individual may desire to keep private.

User input is an action by the user to input data onto the electronic device, such as a keyboard input.

Widget is used to describe any graphic on-screen element.

REFERENCES

[1] Honan, Brian. "Visual Data Security White Paper", July 2012. BH Consulting & European Association for Visual Data Security. http://www.visualdatasecurity.eu/wp-content/uploads/2012/07/Visual-Data-Security-White-Paper-.pdf. Retrieved April 2014

[2] Thomson, Herbert H, PhD. "Visual Data Breach Risk Assessment Study." 2010. People Security Consulting Services, Commissioned by 3M. http://solutions.3m.com/3MContentRetrievalAPI/BlobServlet?assetId=1273672752407&assetType=MMM_Image&blobAttribute=ImageFile. Retrieved April 2014

[3] Vikuiti Privacy Filters. "Shoulder Surfing Survey". 2007. Commissioned by 3M UK PLC. http://multimedia.3m.com/mws/mediawebserver?6666660Zjcf61Vs6EVs66SIZpCOrrrrQ-. Retrieved April 2014

[4] European Association for Visual Data Security. "Visual Data Security", March 2013. http://www.visualdatasecurity.eu/wp-content/uploads/2013/03/Secure-Briefing-2013-UK.pdf. Retrieved April 2014

[5] International Data Corporation. "Worldwide Mobile Worker Population 2011-2015 Forecast." http://cdn.idc.asia/files/5a8911ab-4c6d-47b3-8a04-01147c3ce06d.pdf. Retrieved April 2014

[6] Good Technology. "Americans are Working More, but on their Own Schedule", July 2012. http://wwwl.good.com/about/press-releases/161009045.html. Retrieved April 2014

[7] Nokia, USA. "Nokia Lumia 1020", http://www.nokia.com/us-en/phones/phone/lumia1020/. Retrieved April 2014

[8] NPD DisplaySearch. "Wide Viewing LCD Technologies Gain Store. Due to Tablet PC Demand". January 2012. http://www.displaysearch.com/cps/rde/xchg/displaysearch/hs.xsl/120119_wide_viewing_angle_lcd_technologies_gain_share_due_to_tablet_pc_demand.asp. Retrieved April 2014.

[9] Pillai, Geetha. "Caught on Camera: You are Filmed on CCTV 300 Times a Day in London", International Business Times, March 2012. http://www.ibtimes.co.uk/britain-cctv-camera-surveillance-watch-london-big-312382. Retrieved April 2014

[10] Loh Zhi Chang and Steven Zhou ZhiYing. "Robust pre-processing techniques for OCR applications on mobile devices", In Proceedings of the 6th International Conference on Mobile Technology, Application & Systems (Mobility '09). ACM, New York, N.Y., USA, Article 60, 4 pages. DOI=10.1145/1710035.1710095 http://doi.acm.org/10.1145/1710035.1710095

[11] Owen, Glen. "The zzzzivil servant who fell asleep on the train with laptop secrets in full view", November 2008. http://www.dailymail.co.uk/news/article-1082375/The-zzzzivil-servant-fell-asleep-train-laptop-secrets-view.html. Retrieved April 2014

[12] Penn, Ivan. "Simple fix to bank security breach: Close the blinds", Tampa Bay Times. December 2010. http://www.tampabay.com/features/consumer/simple-fix-to-bank-security-breach-close-the-blinds/1139356. Retrieved April 2014

[13] Davies, Caroline. "Prince William photos slip-up forces MoD to change passwords", The Guardian, November 2102. http://www.theguardian.com/uk/2012/nov/20/prince-william-photos-mod-passwords. Retrieved April 2014

[14] J. Alex Halderman, Brent Waters, and Edward W. Felten. "A convenient method for securely managing passwords", In Proceedings of the 14th international conference on World Wide Web (WWW '05). ACM, New York, N.Y., USA, 471-479. DOI=10.1145/1060745.1060815 http://doi.acm.org/10.1145/1060745.1060815

[15] CTSS Programmers Guide, 2nd Ed., MIT Press, 1965

[16] C. Fleming, P. Peterson, E. Kline and P. Reiher, "Data Tethers: Preventing Information Leakage by Enforcing Environmental Data Access Policies," in International Conference on Communications (ICC), 2012. [17] Yubico. Inc. "About YubiKey". 2014. http://www.yubico.com/about. Retrieved April 2014.

[18] Square, Inc. "About Square", 2014 https://squareup.com/news. Retrieved April 2014.

[19] Google, Inc. "Google NFC YubiKey Neo", September 2013. http://online.wsj.com/news/articles/SB10001424127887323585604579008620509295960

[20] Wayne Jansen and Vlad Korolev. "A Location-Based Mechanism for Mobile Device Security", In Proceedings of the 2009 WRI World Congress on Computer Science and Information Engineering (CSIE '09), Vol. 1. IEEE Computer Society, Washington, D.C., USA, 99-104. DOI=10.1109/CSIE.2009.719 http://dx.doi.org/10.1109/CSIE.2009.719

[21] Google, Inc. Tesseract-OCR. https://code.google.com/p/tesseract-ocr/

[22] Blonder, Greg E. "Graphical Passwords". U.S. Pat. No. 5,559,961, Lucent Technologies, Inc. 1996.

[23] Passfaces Corporation. "The Science Behind Passfaces", June 2004. http://www.realuser.com/published/ScienceBehindPassfaces.pdf

[24] Darren Davis, Fabian Monrose, and Michael K. Reiter. "On user choice in graphical password schemes", In Proceedings of the 13th conference on USENIX Security Symposium—Volume 13 (SSYM'04), Vol. 13. USENIX Association, Berkeley, Calif., USA, 11-11.

[25] Susan Wiedenbeck, Jim Waters, Jean-Camille Birget, Alex Brodskiy, and Nasir Memon. "PassPoints: design and longitudinal evaluation of a graphical password system" International Journal of Human-Computer Studies. 63, 1-2 (July 2005), 102-127. DOI=10.1016/j.ijhcs.2005.04.010 http://dx.doi.org/10.1016/j.ijhcs.2005.04.010

[26] Jain, A. K.; Hong, L.; Pankanti, S.; Bolle, R., "An identity-authentication system using fingerprints," Proceedings of the IEEE, vol. 85, no. 9, pp. 1365, 1388, September 1997. doi: 10.1109/5.628674

[27] J. Daugman. "How iris recognition works", IEEE Transactions on Circuits and Systems for Video Technology. 14, 1 (January 2004), 21-30. DOI=10.1109/TCSVT.2003.818350 http://dx.doi.org/10.1109/TCSVT.2003.818350

[28] Anil K. Jain, Arun Ross, Sharath Pankanti. "A Prototype Hand Geometry-based Verification System", In Proceedings of 2nd International Conference on Audio- and Video-based Biometric Person Authentication (AVBPA), Washington D.C., pp. 166-171, Mar. 22-24, 1999.

[29] W. Zhao, R. Chellappa, P. J. Phillips, and A. Rosenfeld. "Face recognition: A literature survey". ACM Computing Surveys. 35, 4 (December 2003), 399-458. DOI=10.1145/954339.954342 http://doi.acm.org/10.1145/954339.954342

[30] Rick Joyce and Gopal Gupta. "Identity authentication based on keystroke latencies", Communications of the ACM, 33, 2 (February 1990), 168-176. DOI=10.1145/75577.75582 http://doi.acm.org/10.1145/75577.75582

[31] Davrondzhon Gafurov, Kirsi Helkala, Torkjel Sondrol. "Biometric Gait Authentication Using Accelerometer Sensor", Journal of Computers, Vol. 1, No. 7, October 2006.

[32] Roberto Brunelli and Daniele Falavigna. "Person Identification Using Multiple Cues", IEEE Transactions on Pattern Analysis and Machine Intelligence. 17, 10 (October 1995), 955-966. DOI=10.1109/34.464560 http://dx.doi.org/10.1109/34.464560

[33] Alexander De Luca, Alina Hang, Frederik Brudy, Christian Lindner, and Heinrich Hussmann. "Touch me once and I know it's you!: implicit authentication based on touch screen patterns", In Proceedings of the SIGCHI Conference on Human Factors in Computing Systems (CHI '12). ACM, New York, N.Y., USA, 987-996. DOI=10.1145/2207676.2208544 http://doi.acm.org/10.1145/2207676.2208544

[34] Ioannis Leftheriotis. "User authentication in a multi-touch surface: a chord password system" In CHI '13 Extended Abstracts on Human Factors in Computing Systems (CHI EA '13). ACM, New York, N.Y., USA, 1725-1730. DOI=10.1145/2468356.2468665 http://doi.acm.org/10.1145/2468356.2468665

[35] Ming Ki Chong, Gary Marsden, and Hans Gellersen. "GesturePIN: using discrete gestures for associating mobile devices", In Proceedings of the 12th international conference on Human computer interaction with mobile devices and services (MobileHCI '10). ACM, New York, N.Y., USA, 261-264. DOI=10.1145/1851600.1851644 http://doi.acm.org/10.1145/1851600.1851644

[36] Android Developers, Uiautomator. https://developer.android.com/tools/help/uiautomator/index.html

[37] Volker Roth, Kai Richter, and Rene Freidinger. "A PIN-entry method resilient against shoulder surfing", In Proceedings of the 11th ACM conference on Computer and communications security (CCS '04). ACM, New York, N.Y., USA, 236-245. DOI=10.1145/1030083.1030116 http://doi.acm.org/10.1145/1030083.1030116

[38] T. Perkovic, M. Cagalj, and N. Rakic. "SSSL: shoulder surfing safe login", In Proceedings of the 17th international conference on Software, Telecommunications and Computer Networks (SoftCOM'09). IEEE Press, Piscataway, N.J., USA, 270-275.

[39] Alice Boit, Thomas Geimer, and Jorn Loviscach. "A random cursor matrix to hide graphical password input", In SIGGRAPH '09: Posters (SIGGRAPH '09). ACM, New York, N.Y., USA, Article 41, 1 pages. DOI=10.1145/1599301.1599342 http://doi.acm.org/10.1145/1599301.1599342

[40] Rohit Ashok Khot, Ponnurangam Kumaraguru, and Kannan Srinathan. "WYSWYE: shoulder surfing defense for recognition based graphical passwords", In Proceedings of the 24th Australian Computer-Human Interaction Conference (OzCHI '12), ACM, New York, N.Y., USA, 285-294. DOI=10.1145/2414536.2414584 http://doi.acm.org/10.1145/2414536.2414584

[41] Rachna Dhamija and Adrian Perrig. "Deja; Vu: a user study using images for authentication", In Proceedings of the 9th conference on USENIX Security Symposium—Volume 9 (SSYM'00), Vol. 9. USENIX Association, Berkeley, Calif., USA, 4-4.

[42] Mary Brown and Felicia R. Doswell. "Using passtones instead of passwords", In Proceedings of the 48th Annual Southeast Regional Conference (ACM SE '10). ACM, New York, N.Y., USA, Article 82, 5 pages. DOI=10.1145/1900008.1900119 http://doi.acm.org/10.1145/1900008.1900119

[43] Andrea Bianchi, Ian Oakley, and Dong Soo Kwon. "The secure haptic keypad: a tactile password system", In Proceedings of the SIGCHI Conference on Human Factors in Computing Systems (CHI '10). ACM, New York, N.Y., USA, 1089-1092. DOI=10.1145/1753326.1753488 http://doi.acm.org/10.1145/1753326.1753488

[44] Alain Forget, Sonia Chiasson, and Robert Biddle. "Shoulder-surfing resistance with eye-gaze entry in cued-recall graphical passwords", In Proceedings of the SIGCHI Conference on Human Factors in Computing Systems (CHI '10). ACM, New York, N.Y., USA, 1107-1110. DOI=10.1145/1753326.1753491 http://doi.acm.org/10.1145/1753326.1753491

[45] Julie Thorpe, P. C. van Oorschot, and Anil Somayaji. "Pass-thoughts: authenticating with our minds", In Proceedings of the 2005 workshop on New security paradigms (NSPW '05). ACM, New York, N.Y., USA, 45-56. DOI=10.1145/1146269.1146282 http://doi.acm.org/10.1145/1146269.1146282

[46] Nitesh Saxena and James H. Watt. "Authentication technologies for the blind or visually impaired", In Proceedings of the 4th USENIX conference on Hot topics in security (HotSec'09). USENIX Association, Berkeley, Calif., USA, 7-7.

[47] T. Dierks, E. Rescorla. "The Transport Layer Security (TLS) Protocol, Version 1.2", August 2008.

[48] Mason, Andrew G. "Cisco Secure Virtual Private Network". Cisco Press, 2002, p. 7.

[49] Marc Shapiro. "Structure and Encapsulation in Distributed Systems: the Proxy Principle", In Proceedings of the 6th IEEE International Conference on Distributed Computing Systems (ICDCS), Cambridge Mass. (USA), May 1986.

[50] Roger Dingledine, Nick Mathewson, and Paul Syverson. "Tor: the second-generation onion router", In Proceedings of the 13th conference on USENIX Security Symposium (SSYM'04), Vol. 13. 2004 USENIX Association, Berkeley, Calif., USA, 21-21.

[51] Do Not Track. "Do Not Track—Universal Web Tracking Opt Out", http://donottrack.us. Retrieved April 2014

[52] Adblock Plus. "Adblock Plus: About", https://adblockplus.org/en/about. Retrieved April 2014

[53] Evidon, Inc. "About Ghostery", https://www.ghostery.com/en/about. Retrieved April 2014

[54] Braden Kowitz and Lorrie Cranor. "Peripheral privacy notifications for wireless networks", In Proceedings of the 2005 ACM workshop on Privacy in the electronic society (WPES '05). ACM, New York, N.Y., USA, 90-96. DOI=10.1145/1102199.1102217 http://doi.acm.org/10.1145/1102199.1102217

[55] Sunny Consolvo, Jaeyeon Jung, Ben Greenstein, Pauline Powledge, Gabriel Maganis, and Daniel Avrahami.

"The Wi-Fi privacy ticker: improving awareness & control of personal information exposure on Wi-Fi", In Proceedings of the 12th ACM international conference on Ubiquitous computing (Ubicomp '10). ACM, New York, N.Y., USA, 321-330. DOI=10.1145/1864349.1864398 http://doi.acm.org/10.1145/1864349.1864398.

[56] Simon Khalaf. "Apps Solidify Leadership Six Years into Mobile Revolution," Flurry, http://www.flurry.com/bid/109749/Apps-Solidify-Leadership-Six-Years-into-the-Mobile-Revolution, 2014.

[57] Google, Inc. Google Glass. http://www.google.com/glass/start/

[58] Rahul Raguram, Andrew M. White, Dibyendusekhar Goswami, Fabian Monrose, and Jan-Michael Frahm. 2011. iSpy: automatic reconstruction of typed input from compromising reflections. In Proceedings of the 18th ACM conference on Computer and communications security (CCS'11). ACM, New York, N.Y., USA, 527-536. DOI=10.1145/2046707.2046769 http://doi.acm.org/10.1145/2046707.2046769

[59] Erika McCallister, Tim Grance, Karen Scarfone. Guide to Protecting the Confidentiality of Personally Identifiable Information (SP 800-122). National Institute of Standards and Technology, http://csrc.nist.gov/publications/nistpubs/800-122/sp800-122.pdf

[60] Android Developers, Android Debug Bridge. https://developer.android.com/tools/help/adb.html All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A computer-implemented method for defending against visual observations of sensitive text displayed by an electronic device, comprising executing on a processor the steps of:

assigning a sensitive text value to an alias value and storing the sensitive text value and assigned alias value in a digital alias repository;

responsive to a first user inputting text to be visually displayed on a first user's electronic device following a visual display refresh event:

intercepting the inputted text intended for visual display prior to being displayed on the first user's electronic device;

scanning the intercepted text for any sensitive text values that match those stored in the digital alias repository;

replacing each identified sensitive text value detected in the intercepted text with the assigned alias value stored in the digital alias repository; and displaying the assigned alias values that replaced the identified sensitive text values on the first user's electronic device.

2. The computer-implemented method of claim 1, further comprising:

receiving a user request to access the digital alias repository;

presenting a user with a login routine, wherein said login routine requires a user identification and password;

verifying the user identification and password match a predetermined user identification and password and providing the user access to the digital alias repository upon verification; and receiving and storing any updates to sensitive text values or alias values.

3. The computer-implemented method of claim 1, wherein the step of intercepting text occurs through the interception of on-screen user interface elements when the text is contained in text-displaying screen widgets.

4. The computer-implemented method of claim 1, wherein the step of intercepting text occurs through the interception of a web rendering engine when the text is contained in a web browser.

5. The computer-implemented method of claim 1, wherein each alias value is prepended with an alias identifying value.

6. The computer-implemented method of claim 1, further comprising receiving an application identification and accessing an application-specific alias repository based on the application identification received.

7. The computer-implemented method of claim 1, wherein the alias value is a non-unique string value.

8. The computer-implemented method of claim 1, wherein the alias repository is locally stored on the electronic device.

9. The computer-implemented method of claim 1, wherein the step of intercepting text occurs within graphic rendering libraries when the intercepted text is in graphic form.

10. The computer-implemented method of claim 1, wherein the alias value is ASCII text.

11. The computer-implemented method of claim 1, further comprising, responsive to a data transmission action, intercepting the alias values prior to transmission and replacing the identified alias values with the associated sensitive text values, such that the sensitive text values are transmitted in place of the identified alias values, wherein the data transmission is a POST or GET request.

12. A computer-implemented method for defending against observations of sensitive information conveyed to a user through an electronic device, comprising executing on a processor the steps of:

assigning a sensitive data value to an alias value and storing the sensitive data value and assigned alias value in a digital alias repository;

responsive to a user-initiated visual display refresh event triggering the conveyance of information to the user on the user's electronic device:

automatically intercepting the information intended for conveyance by hooking into a peripheral output device;

scanning the intercepted information for any sensitive data values that match those stored in the digital alias repository;

replacing in the peripheral output device, each identified sensitive data value detected in the intercepted information with the assigned alias value stored in the digital alias repository; and conveying to the user the intercepted information with the identified sensitive data values replaced by their respective alias values.

13. The computer-implemented method of claim 12, further comprising:

receiving a user request to access the digital alias repository;

presenting a user with a login routine, wherein said login routine requires a user identification and password;

verifying the user identification and password match a predetermined user identification and password and providing the user access to the digital alias repository upon verification; and receiving and storing any updates to sensitive data values or alias values.

14. The computer-implemented method of claim 12, wherein the step of intercepting information occurs through the interception of TextView when the information is contained in text-displaying screen widgets.

15. The computer-implemented method of claim 12, wherein the step of intercepting information occurs through the interception of Web View when the information is contained in a web browser.

16. The computer-implemented method of claim 12, further comprising receiving an application identification and accessing an application-specific alias repository based on the application identification received.

17. The computer-implemented method of claim 12, wherein the alias value is a non-unique string value.

18. The computer-implemented method of claim 12, wherein the alias repository is locally stored on the electronic device.

19. The computer-implemented method of claim 12, wherein the step of intercepting information occurs at GLtext when the intercepted information is in graphic form.

20. A system, downloaded to an electronic device through a code-injection framework, for defending against visual observations of sensitive text displayed by the electronic device, the system comprising:

a digital alias repository including sensitive text values assigned to alias values, wherein the digital alias repository is communicatively coupled to a computer processor on the electronic device, wherein the computer processor executes application code instructions in response to a visual display screen refresh event to cause the system to:

automatically intercept text intended for visual display on the electronic device;

scan the intercepted text for any sensitive text values that match those stored in the digital alias repository;

replace each identified sensitive text value detected in the intercepted text with the assigned alias value stored in the digital alias repository;

display the intercepted text with the identified sensitive text values replaced by their respective alias values on the electronic device; and in response to a data transmission action, intercept the alias values prior to transmission and replace the identified alias values with the associated sensitive text values, such that the sensitive text values are transmitted in place of the identified alias values.

* * * * *